US012318765B2

(12) United States Patent
Baudhuin

(10) Patent No.: US 12,318,765 B2
(45) Date of Patent: Jun. 3, 2025

(54) APPARATUS FOR SUPERCRITICAL WATER GASIFICATION

(71) Applicant: Thomas J. Baudhuin, Canton, GA (US)

(72) Inventor: Thomas J. Baudhuin, Canton, GA (US)

( * ) Notice: Subject to any disclaimer, the term of this patent is extended or adjusted under 35 U.S.C. 154(b) by 692 days.

(21) Appl. No.: 17/617,523

(22) PCT Filed: Jun. 9, 2020

(86) PCT No.: PCT/US2020/036799
§ 371 (c)(1),
(2) Date: Dec. 8, 2021

(87) PCT Pub. No.: WO2020/251939
PCT Pub. Date: Dec. 17, 2020

(65) Prior Publication Data
US 2022/0250021 A1    Aug. 11, 2022

Related U.S. Application Data

(60) Provisional application No. 62/859,227, filed on Jun. 10, 2019.

(51) Int. Cl.
*B01J 3/00*    (2006.01)
*B01J 3/02*    (2006.01)
(Continued)

(52) U.S. Cl.
CPC .................. *B01J 3/008* (2013.01); *B01J 3/02* (2013.01); *B01J 3/042* (2013.01); *B01J 4/002* (2013.01);
(Continued)

(58) Field of Classification Search
CPC ..... B01J 3/008; B01J 3/02; B01J 3/042; B01J 3/002; B01J 3/005; B01J 19/0013;
(Continued)

(56) References Cited

U.S. PATENT DOCUMENTS 3,975,168 A * 8/1976 Gorbaty ................. C10K 1/101
48/197 R
4,017,271 A    4/1977 Barclay et al.
(Continued)

FOREIGN PATENT DOCUMENTS

CN    106010662 A    10/2016
CN    106244241 B    12/2018
(Continued)

OTHER PUBLICATIONS

Castello et al., Supercritical Water Gasification of Biomass in a Ceramic Reactor: Long-Time Batch Experiments, Energies, 2017, 10(11):1734, pp. 1-17.
(Continued)

*Primary Examiner* — Matthew J Merkling
(74) *Attorney, Agent, or Firm* — Quarles & Brady LLP

(57) ABSTRACT

The present disclosure provides a supercritical fluid gasification system. In some embodiments, the system includes a reactor having a reactor shell including sidewalls that extend between a top reactor cover and a bottom reactor cover, where the sidewalls, the top cover, and the bottom cover enclosing a reactor shell channel. In some embodiments, the reactor includes a thermal shield positioned within the reactor shell channel, the thermal shield having sidewalls that extend between a top thermal shield cover and a bottom thermal shield cover, where the sidewalls, the top thermal shield cover, and the bottom thermal shield cover enclosing a thermal shield channel. In some embodiments, the reactor includes a fluid feed supply conduit in fluid communication
(Continued)

with the thermal shield channel, a supercritical fluid conduit in fluid communication with the thermal shield channel, and a product conduit in fluid communication with the thermal shield channel.

20 Claims, 12 Drawing Sheets

(51) Int. Cl.
| | |
|---|---|
| B01J 3/04 | (2006.01) |
| B01J 4/00 | (2006.01) |
| B01J 19/00 | (2006.01) |
| C10J 3/76 | (2006.01) |
| C10J 3/78 | (2006.01) |

(52) U.S. Cl.
CPC ........... *B01J 4/005* (2013.01); *B01J 19/0013* (2013.01); *B01J 19/0073* (2013.01); *C10J 3/76* (2013.01); *C10J 3/78* (2013.01); *B01J 2219/00092* (2013.01); *C10J 2200/09* (2013.01); *C10J 2300/0979* (2013.01)

(58) Field of Classification Search
CPC    B01J 19/0073; B01J 2219/00092; C10J 3/76; C10J 3/78; C10J 2200/09; C10J 2300/0979

See application file for complete search history.

(56) References Cited

U.S. PATENT DOCUMENTS

| | | | |
|---|---|---|---|
| 4,199,545 A |  | 4/1980 | Matovich |
| 4,284,133 A |  | 8/1981 | Gianni et al. |
| 4,564,458 A |  | 1/1986 | Burleson |
| 4,594,164 A |  | 6/1986 | Titmas |
| 4,707,163 A | * | 11/1987 | Gudymov .................. C10J 3/74 48/DIG. 2 |
| 4,822,497 A |  | 4/1989 | Hong et al. |
| 5,387,398 A |  | 2/1995 | Mueggenburg et al. |
| 5,464,592 A | * | 11/1995 | Brooker ................... C10J 3/526 122/6 C |
| 5,571,224 A |  | 11/1996 | Aloisi et al. |
| 5,571,424 A |  | 11/1996 | Ahluwalia |
| 5,670,040 A |  | 9/1997 | Ahluwalia |
| 7,037,473 B1 | * | 5/2006 | Donner .................... C10J 3/485 48/77 |
| 7,186,245 B1 |  | 3/2007 | Cheng et al. |
| 7,863,489 B2 |  | 12/2011 | Johnston et al. |
| 8,075,645 B2 |  | 12/2011 | Jia et al. |
| 8,361,175 B2 |  | 1/2013 | Goldacker et al. |
| 8,404,008 B2 |  | 3/2013 | Wootton et al. |
| 8,536,234 B2 |  | 9/2013 | Kukhar et al. |
| 8,550,835 B2 |  | 10/2013 | Montena |
| 8,568,518 B2 |  | 10/2013 | Bonekamp et al. |
| 8,727,000 B2 |  | 5/2014 | O'Dowd |
| 8,888,875 B2 |  | 11/2014 | Ramamurthy |
| 8,968,425 B2 |  | 3/2015 | Kim et al. |
| 9,352,178 B2 |  | 5/2016 | Surovtsev |
| 9,376,635 B2 |  | 6/2016 | McGrady et al. |
| 9,656,230 B2 |  | 5/2017 | Choi |
| 9,896,633 B2 |  | 2/2018 | Graf et al. |
| 2003/0196576 A1 | * | 10/2003 | Whittaker ................ C10J 3/506 110/260 |
| 2005/0109603 A1 | * | 5/2005 | Graham .................... C10J 3/723 201/25 |
| 2007/0214721 A1 |  | 9/2007 | Wootton et al. |
| 2008/0134578 A1 | * | 6/2008 | Yu ............................ C10J 3/506 48/67 |
| 2008/0172941 A1 | * | 7/2008 | Jancker ...................... C10J 3/84 48/202 |
| 2009/0206006 A1 |  | 8/2009 | Allam |
| 2009/0226350 A1 | * | 9/2009 | Fusselman ................ C01B 3/32 422/241 |
| 2010/0031570 A1 | * | 2/2010 | Chen ......................... C10J 3/78 29/890.03 |
| 2010/0041841 A1 |  | 2/2010 | Terry et al. |
| 2013/0039818 A1 |  | 2/2013 | Degenkolb et al. |
| 2014/0048744 A1 |  | 2/2014 | Avagliano et al. |
| 2015/0080626 A1 | * | 3/2015 | Boon ....................... C10K 3/04 585/242 |
| 2016/0075957 A1 |  | 3/2016 | Cooke |
| 2016/0194569 A1 |  | 7/2016 | Graf et al. |
| 2017/0362119 A1 |  | 12/2017 | Dejneka et al. |
| 2018/0117561 A1 |  | 5/2018 | Brucato et al. |
| 2018/0135004 A1 |  | 5/2018 | Bradin et al. |
| 2019/0039036 A1 |  | 2/2019 | Brucato et al. |

FOREIGN PATENT DOCUMENTS

| | | |
|---|---|---|
| RU | 2017135814 A | 4/2019 |
| WO | 2017153970 A1 | 9/2017 |
| WO | 2018083785 A1 | 5/2018 |
| WO | 2018115593 A1 | 6/2018 |

OTHER PUBLICATIONS

Richard et al., Corrosion of Ceramics for Vinasse Gasification in Supercritical Water, Journal of the European Ceramic Society, 2012, 32(10):2219-2233.
European Patent Office, Extended European Search Report, Application No. 20823179.5, Jun. 9, 2023, 11 bages.
Machine Translation of CN106010662.
Machine Translation of CN106244241.
Machine Translation of RU2017135814.
Machine Translation of WO2018083785.

* cited by examiner

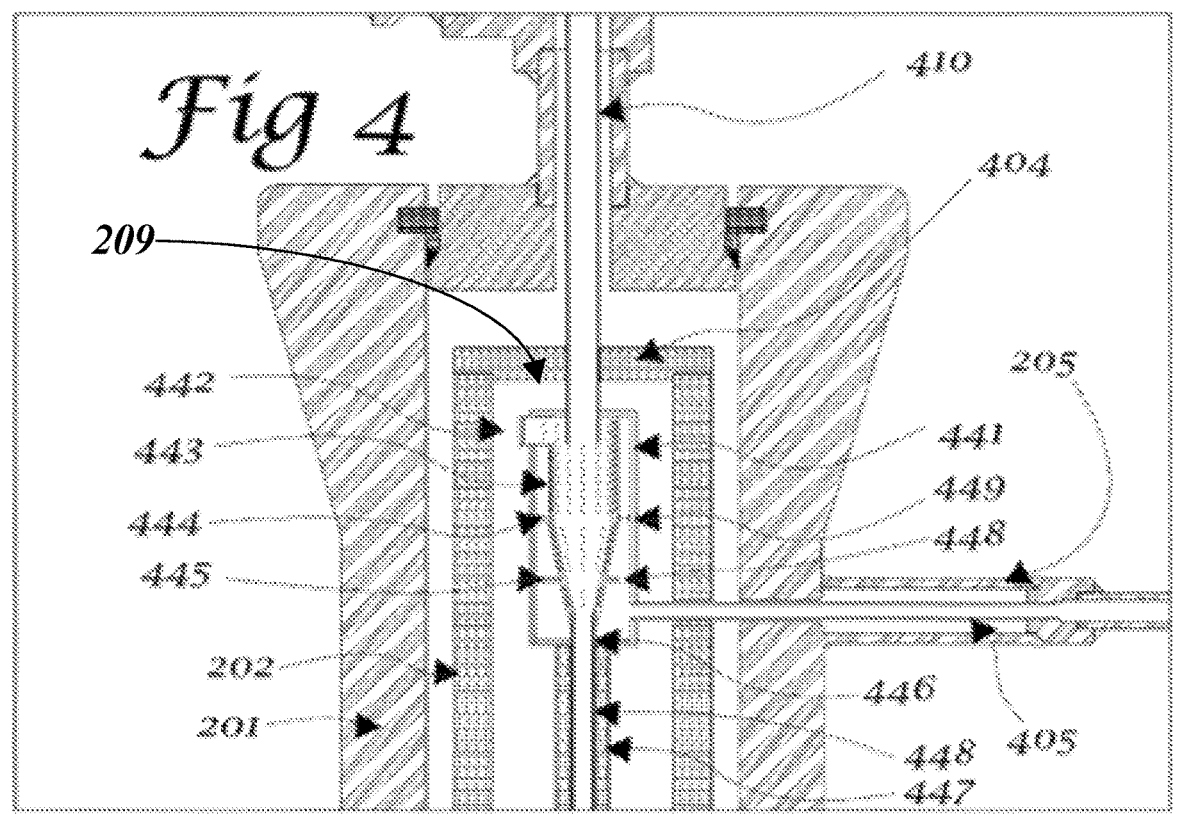
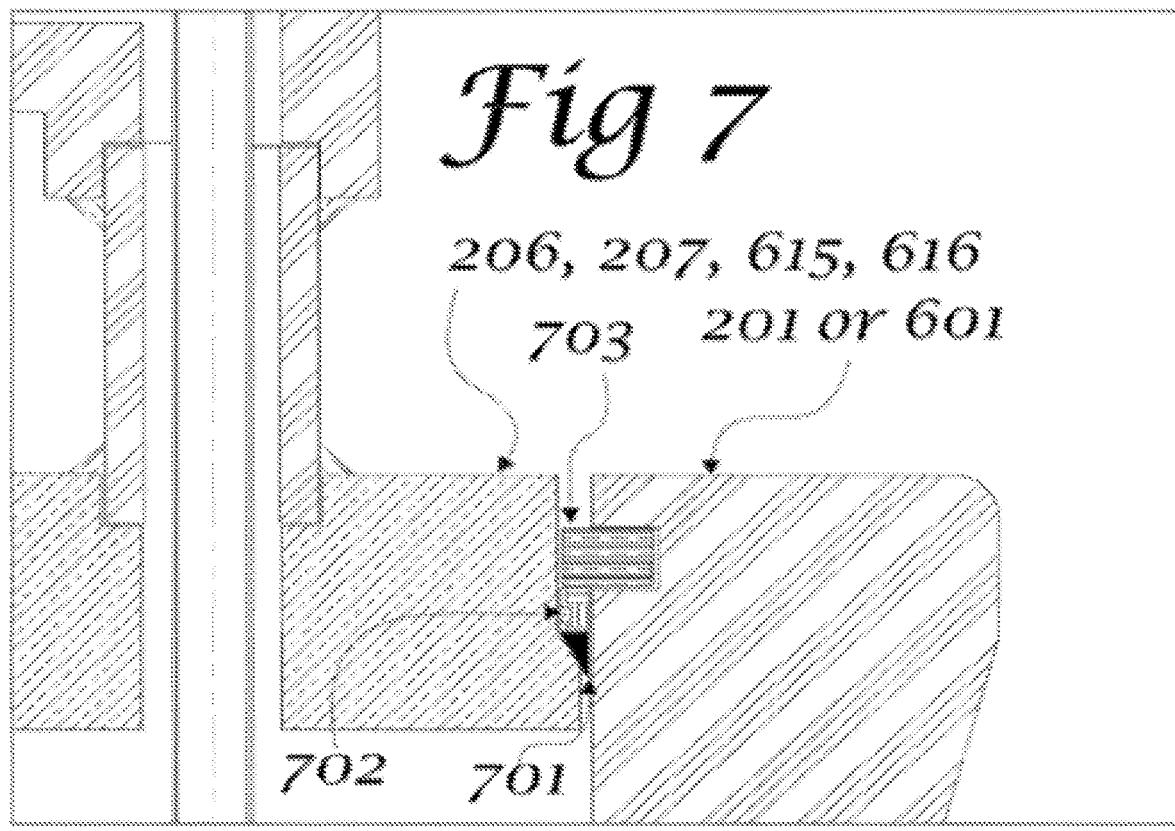

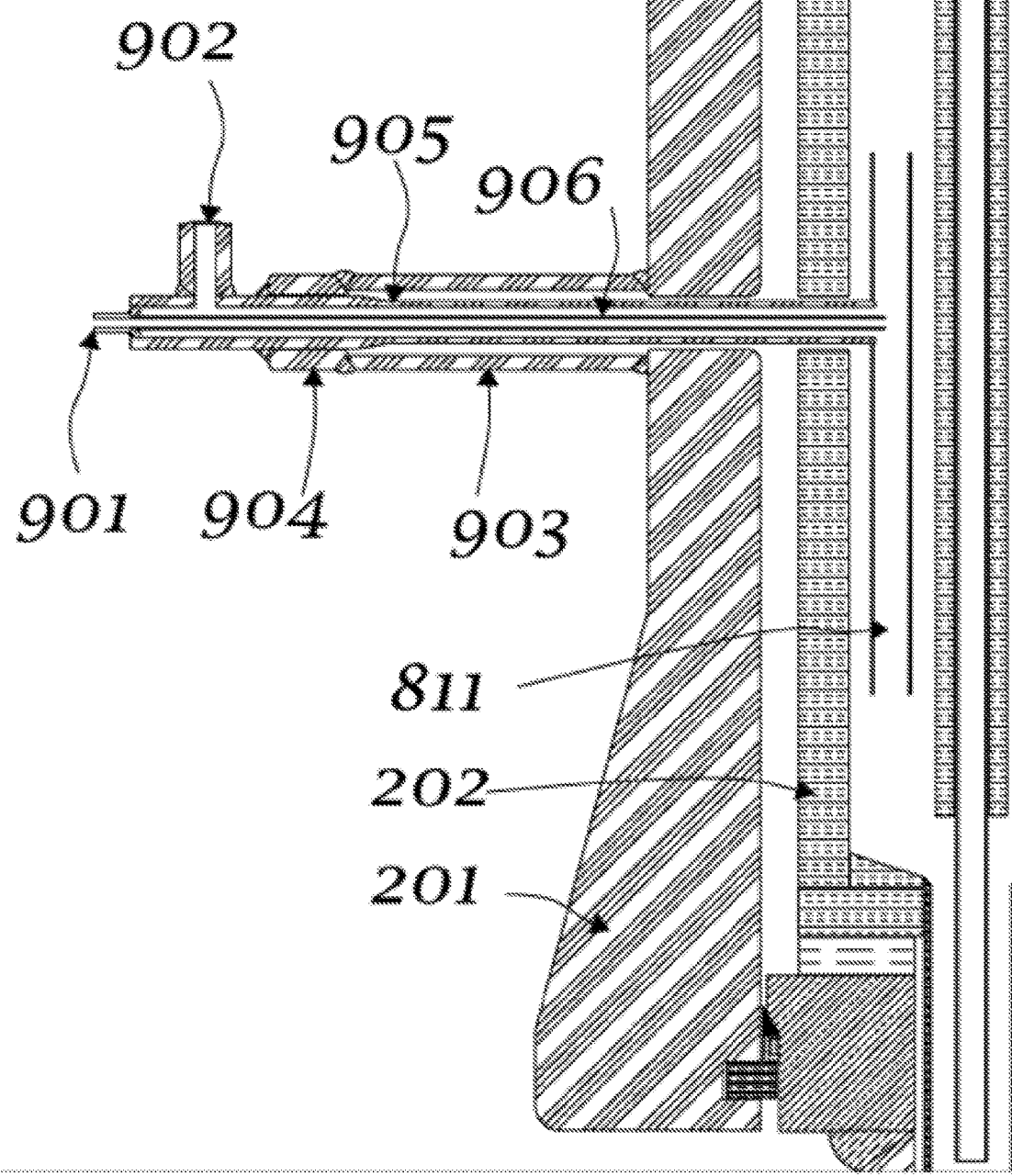

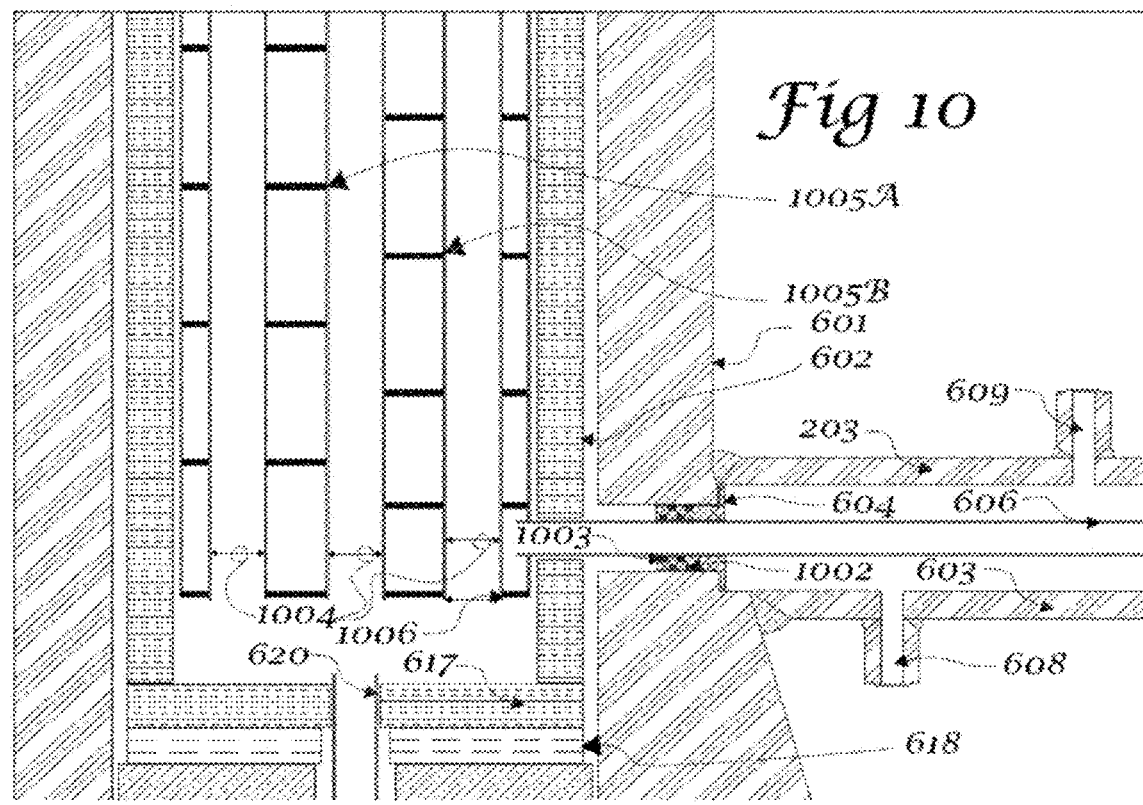
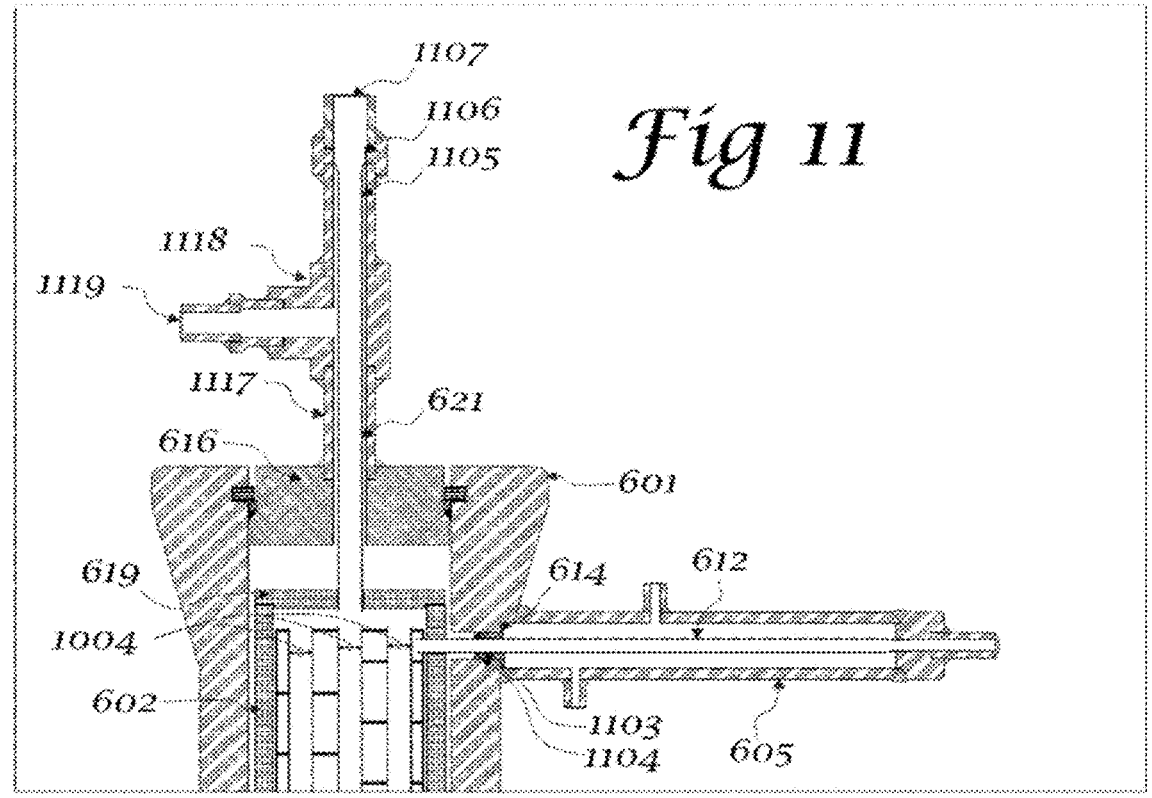

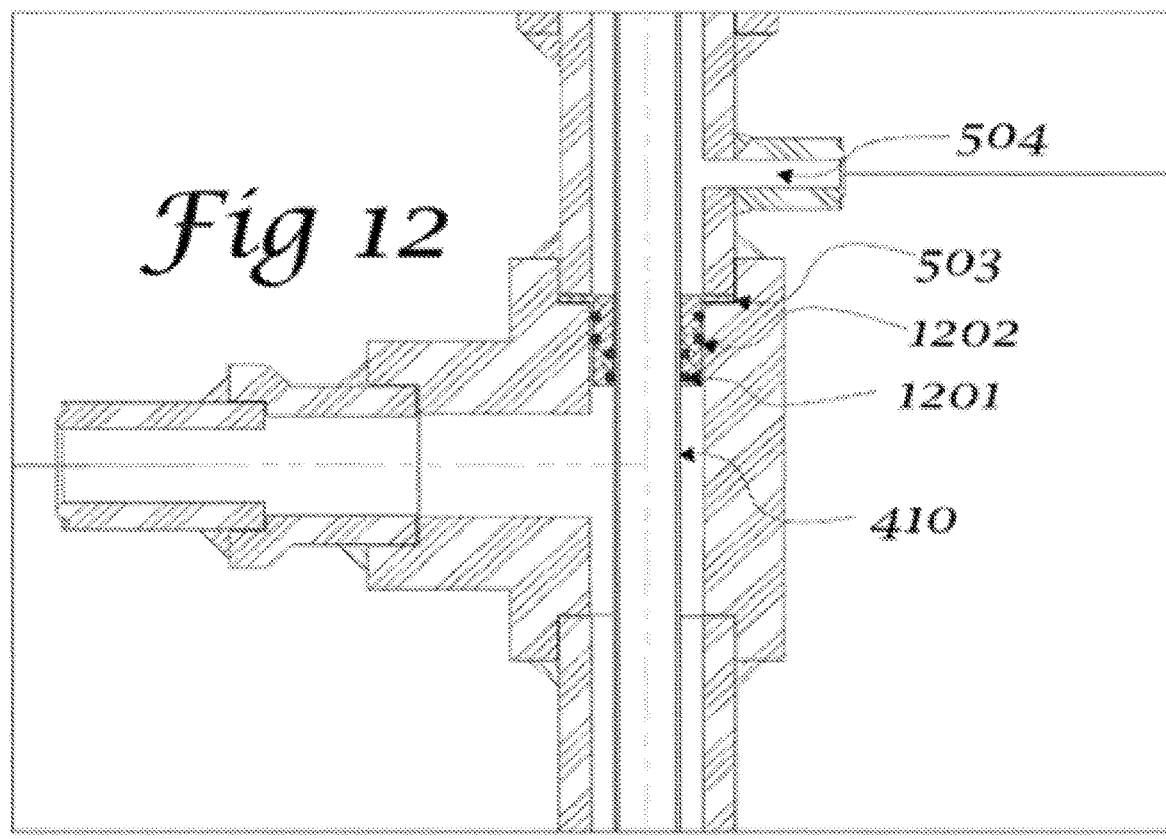
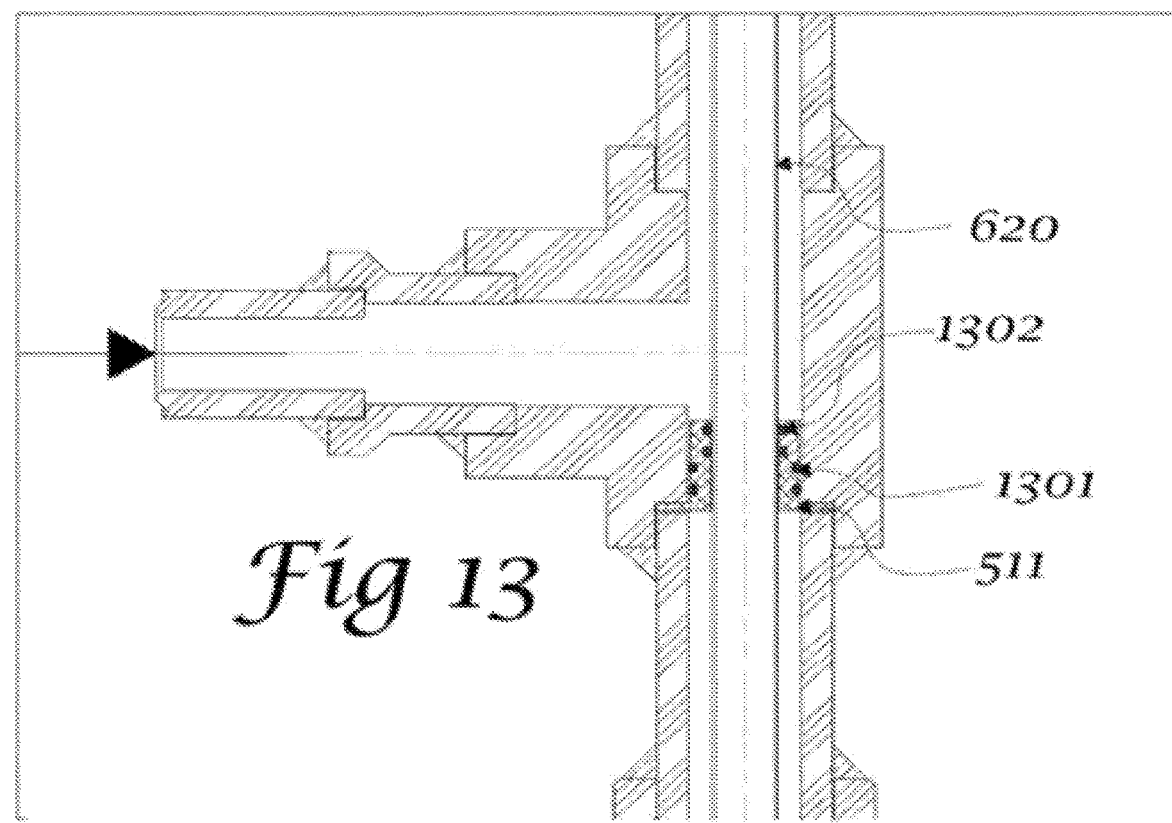

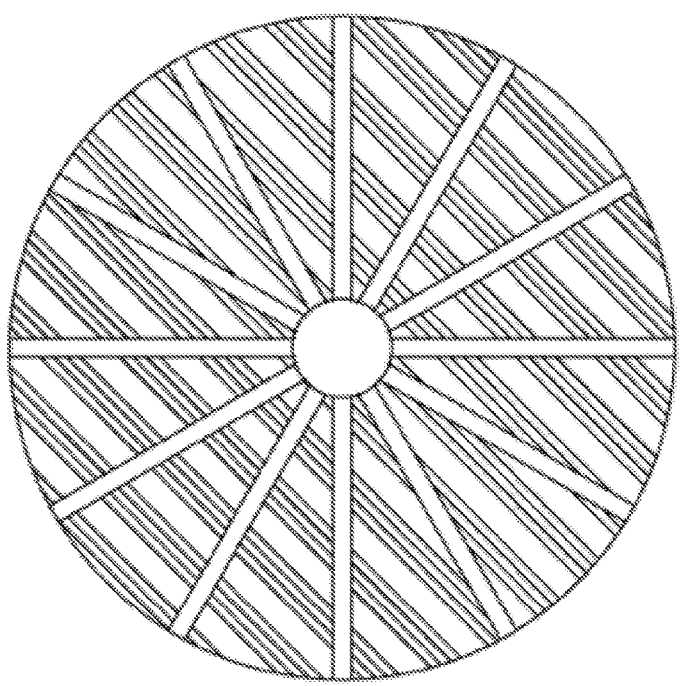
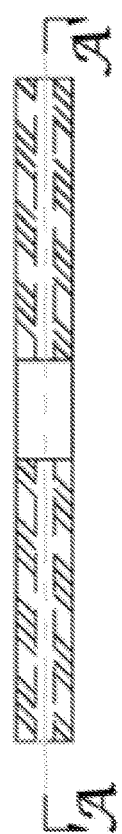
Fig 14
Section A-A

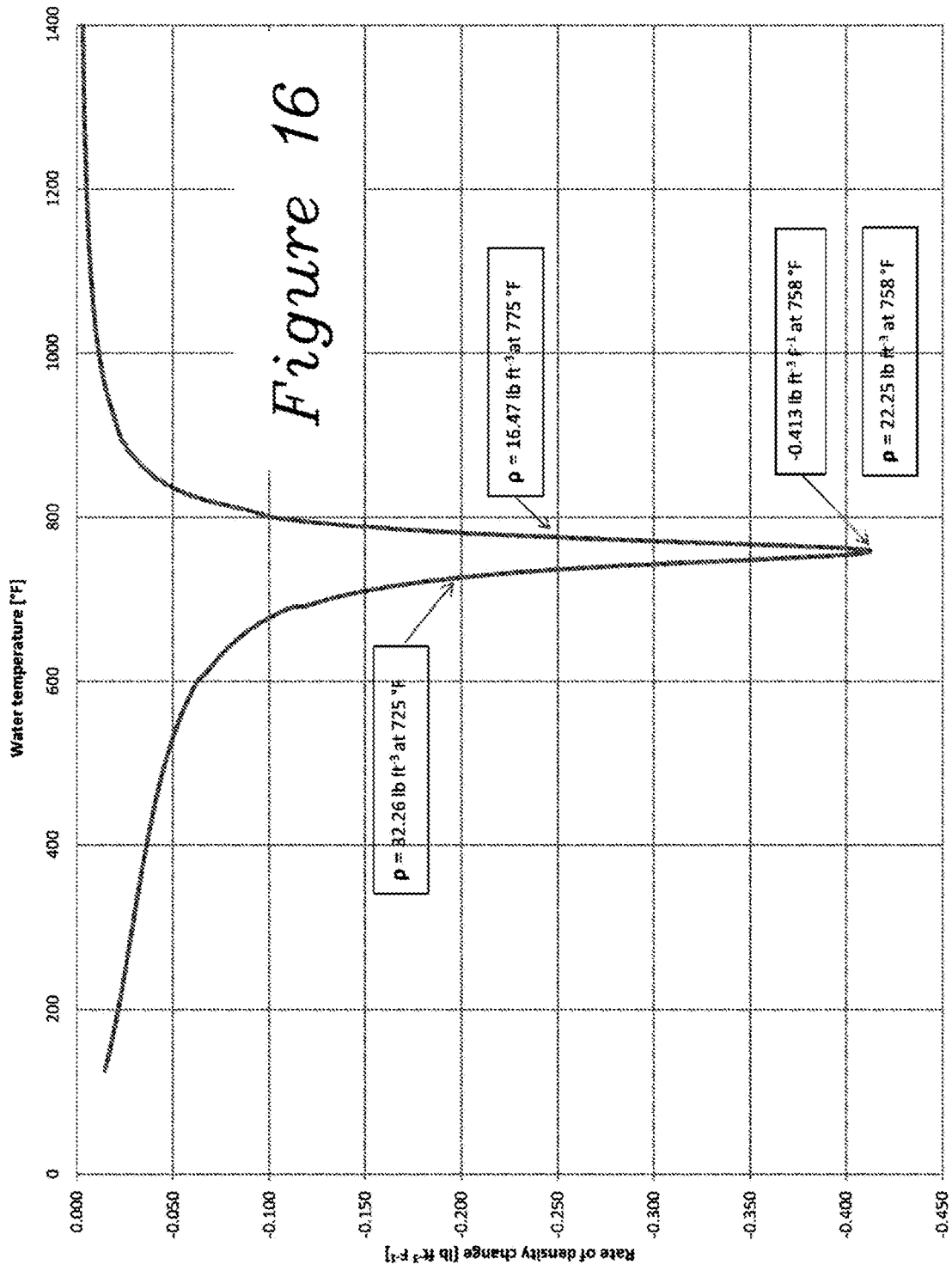

APPARATUS FOR SUPERCRITICAL WATER GASIFICATION

CROSS-REFERENCES TO RELATED APPLICATIONS

This application represents the U.S. national stage entry of International Application No. PCT/US2020/036799 filed Jun. 9, 2020, which claims priority to U.S. Provisional Patent Application No. 62/859,227 filed Jun. 10, 2019, which is incorporated by reference herein for all purposes.

STATEMENT REGARDING FEDERALLY SPONSORED RESEARCH

Not Applicable.

BACKGROUND OF THE INVENTION

1. Field of the Invention

The present disclosure generally relates to supercritical water reactors and apparatus for supercritical water gasification.

2. Description of the Related Art

Supercritical water is a useful solvent to break down carbonaceous materials into a mixture of simple molecules. The most common products are $H_2O$, $H_2$, $CO_2$, $CH_4$, and CO. This is classified as supercritical water gasification. Supercritical water is defined as water that is both at a pressure greater than the critical pressure, and at a temperature greater than the critical temperature. For water, the critical pressure is 3200 psi, and the critical temperature is 705° F. A key distinction between a supercritical fluid and a subcritical fluid is that coexisting liquid and vapor phases no longer exist. A boiling point and a latent heat of evaporation can no longer be measured.

Supercritical water reactors for research purposes have been used for many years, and both laboratory testing results and theoretical analysis papers have been published. The combination of high pressure and high temperature has required the reactor pressure vessel to be fabricated from very expensive alloys. At the temperatures required to achieve rapid reaction rates, even the cutting edge super alloys must be limited to stress levels that are but a fraction of the stress level that the same alloy can tolerate at ambient conditions.

Much effort has been made into finding catalysts to produce a high quality end product at temperatures of 1000° F. and lower. However, experimental data have indicated that at this time there are no catalysts that can produce high quality product and low char production with lower operating temperatures.

SUMMARY OF THE PRESENT DISCLOSURE

The present disclosure overcomes the aforementioned problems. In any one or more embodiments herein, the present apparatus can include an internal thermal shield that is cooled with supercritical water that is slightly higher in pressure, but is at a temperature low enough, that pressure vessel grade carbon steel can be used to make the apparatus. The thermal shielding and cooling concept of the present disclosure can be utilized for both the pressure vessel dedicated to chemical reactions and the pressure vessel dedicated to the recovery of heat from the reaction product and using that heat to preheat incoming feedwater to the pressure vessel.

The thermal shielding can provide excellent resistance to the chemical environment inside the pressure vessel or reactor and is well suited for direct contact with the product produced in the reactor. In addition, the thermal shield can exhibit a thermal conductivity that is significantly less than steel and also exhibit a low thermal expansion property. However, since the thermal shield is not the primary pressure boundary, a high tensile strength for the thermal shield materials of construction is not required.

Two examples of suitable thermal shielding material are fused silica (e.g., 99-100 wt % silica), and a consolidated high-silica, high-temperature, reconstructed glass comprising approximately 96% silica and 3% boron trioxide having a thermal coefficient of expansion at 0/300° C. of $7.5 \times 10^{-7}$/° C. (commercially available as Vycor™). While both materials are high in silica ($SiO_2$) content, their manufacturing processes are different, as well as their mechanical properties. Other options for the thermal shielding, include but not are limited to, metal oxides such as zirconia ($ZrO_2$) and alumina ($Al_2O_3$), or mixtures of other ceramic materials known to individuals experienced in the art of ceramics chemistry.

While the water used to cool the thermal shielding can be pumped, an embodiment of the present disclosure takes advantage of the significant change in density of supercritical water that is known to occur at the pseudocritical temperature. This change of density occurs while the cooling water is gaining heat that is transferred through the thermal shield. After the cooling water exits the reactor (which can be, for example, at the top), it is cooled to a temperature below the pseudocritical temperature in an auxiliary heat exchanger. A supply conduit can be connected to the bottom of the reactor to replenish the cooling circuit. The difference in the average density of the cooling water inside the reactor can be less than the average density of the water in the conduit outside the reactor and can establish a pressure differential that induces natural circulation. Natural circulation is a less costly and more reliable than mechanical circulation, such as by a mechanical pump.

Since no attempt is made to establish a watertight pressure boundary between the thermal shield and the inner section of the reactor, some cooling loop water can leak into the reactor circuit as long as the water in the cooling loop remains slightly greater in pressure than the pressure inside the reactor. This feature can have a significant benefit regarding the materials of construction for both the reactor pressure vessel shell and the shell of the recuperative heat exchanger. The product contains a significant fraction of hydrogen. Hydrogen is known to degrade many types of pressure vessel grade steels in a mechanism called hydrogen embrittlement. By utilizing pure water as the working fluid to cool the reactor thermal shield, the operating life and safety of pressure vessel grade carbon steel provides a lower cost option than the more costly hydrogen embrittlement resistant alloy steels.

In another embodiment herein, long oversized connection nozzles can be used that can attenuate thermal stresses that are due to flow streams that enter the reactor at a significantly different temperature than the reactor shell temperature. Additionally, a feature called a dry-well can also be introduced in the present apparatus disclosed herein. In any one or more aspects, the annular volume between the feedwater conduit and the nozzle conduit can be charged with a high pressure, inert gas and insulating materials to reduce heat losses in the feedwater conduit, while also allowing for a drastic reduction in the thickness of the inner conduit. Feedwater entering and leaving both the reactor and the high temperature recuperative heat exchanger can operate at a temperature where higher alloy steels are required, but thinner, less expensive wall thickness of the conduits are allowed because the differential pressure between the feedwater (or product) in the conduit and the gas in the dry-well are negligible.

In one aspect, the disclosure provides a supercritical fluid gasification system comprising: a reactor including: (i) a reactor shell having sidewalls that extend between a top reactor cover and a bottom reactor cover, the sidewalls, the top cover, and the bottom cover enclosing a reactor shell channel; (ii) a thermal shield positioned within the reactor shell channel, the thermal shield having sidewalls that extend between a top thermal shield cover and a bottom thermal shield cover, the sidewalls, the top thermal shield cover, and the bottom thermal shield cover enclosing a thermal shield channel; (iii) a fluid feed supply conduit in fluid communication with the thermal shield channel; (iv) a supercritical fluid conduit in fluid communication with the thermal shield channel; and (v) a product conduit in fluid communication with the thermal shield channel.

The supercritical fluid gasification system may further comprise: a recuperative heat exchanger including: (i) a shell defining at least one internal channel, the at least one internal channel extending between a shell inlet and a shell outlet; (ii) heat exchanger conduits extending through the at least one internal channel of the shell side, the heat exchanger conduits extending between an inlet and an outlet, wherein the inlets are in fluid communication with the product conduit of the thermal shield channel. The recuperative heat exchanger may further comprise: (iii) a pressure vessel shell having sidewalls that extend between a top pressure seal cover and a bottom pressure seal cover, the sidewalls, the top pressure seal cover, and the bottom pressure seal cover enclosing a pressure vessel channel; (iv) a heat exchanger thermal shield positioned within the pressure vessel shell, the heat exchanger thermal shield having sidewalls that extend between a top heat exchanger thermal shield cover and a bottom heat exchanger thermal shield cover, the sidewalls, the top heat exchanger thermal shield cover, and the bottom heat exchanger thermal shield cover enclosing a heat exchanger thermal shield channel, wherein the shell and tube heat exchanger conduits are positioned within the thermal shield.

In one version of the supercritical fluid gasification system, the supercritical fluid conduit is in fluid communication with the shell outlet.

The supercritical fluid gasification system may further comprise: a supercritical fluid nozzle sealingly coupled to the reactor shell, the supercritical fluid nozzle including a channel extending through the supercritical fluid nozzle, and wherein the supercritical fluid conduit extends through the channel within the supercritical fluid nozzle. The supercritical fluid nozzle may include a gas inlet and a gas outlet in fluid communication with the channel. The channel can have an interior surface that is spaced from an exterior surface of the supercritical fluid conduit.

The supercritical fluid gasification system may further comprise: a fluid feed nozzle sealingly coupled to the reactor shell, the fluid feed nozzle including a channel extending through the nozzle, wherein the fluid feed supply conduit extends through the channel within the fluid feed nozzle.

The supercritical fluid gasification system may further comprise: a cyclonic separator configured in the thermal shield channel, the cyclonic separator including: (i) a housing including a tangential inlet; (ii) cyclone walls extending from a top end in fluid communication with the product conduit to a bottom end in fluid communication with a drain conduit, wherein at least a portion of the cyclone walls taper inward towards the bottom end.

The supercritical fluid gasification system may further comprise: a coupling conduit including: (i) an outer coupling shell including a coupling conduit channel, wherein the product conduit extends through the coupling conduit channel.

In one version of the supercritical fluid gasification system, the thermal shield comprises one or more metal oxides, such as zirconia and alumina. In one version of the supercritical fluid gasification system, the thermal shield comprises: from 90 wt % to 98 wt % of silica, based on the total weight of the thermal shield; and from 2 wt % to 10 wt % boron trioxide, based on the total weight of the thermal shield. In one version of the supercritical fluid gasification system, the thermal shield comprises 99 wt % to 100 wt % of silica.

The supercritical fluid gasification system may further comprise a reactor cooling circuit including: a supplemental feedwater conduit in fluid communication with a T-junction that splits the supplemental feedwater conduit into a first cooling conduit and a second cooling conduit, wherein the first cooling conduit is in fluid communication with the reactor shell channel, and wherein the second cooling conduit is in fluid communication with the thermal shield channel. The first cooling conduit can be placed in fluid communication with the reactor shell channel at an outlet positioned on an upper portion of the reactor shell. The second cooling conduit can be in fluid communication with the thermal channel at an outlet position on a bottom portion of the reactor shell and the thermal shield.

The supercritical fluid gasification system may further comprise: an oxygen conduit in fluid communication with the thermal shield channel.

In another aspect, the disclosure provides a method comprising the steps of: feeding a carbonaceous feed material to a reactor through a fluid feed supply conduit; and feeding a supercritical feedwater to the reactor through a supercritical feed supply conduit, the reactor including: (i) a reactor shell having sidewalls that extend between a top reactor cover and a bottom reactor cover, the sidewalls, the top cover, and the bottom cover enclosing a reactor shell channel; (ii) a thermal shield positioned within the reactor shell channel, the thermal shield having sidewalls that extend between a top thermal shield cover and a bottom thermal shield cover, the sidewalls, the top thermal shield cover, and the bottom thermal shield cover enclosing a thermal shield channel; (iii) the fluid feed supply conduit in fluid communication with the thermal shield channel; (iv) the supercritical fluid conduit in fluid communication with the thermal shield channel; and (v) a product conduit in fluid communication with the thermal shield channel, the product conduit dispensing a product stream from the reactor. The method may further comprise: cooling the product stream in a recuperative heat exchanger, the recuperative heat exchanger including: (i) a shell defining at least one internal channel, the at least one internal channel extending between a shell inlet and a shell outlet; (ii) heat exchanger conduits extending through the at least one internal channel of the shell side, the heat exchanger conduits extending between an inlet and an outlet, wherein the inlets of the heat exchanger conduits are in fluid communication with the product conduit of the thermal shield channel. The method may further comprise heating a supercritical feedwater stream in the recuperative heat exchanger by passing the supercritical feedwater stream through the at least one internal channel of the shell. The method may further comprise feeding the supercritical feedwater stream exiting the at least one internal channel of the shell to the supercritical fluid conduit.

Thus, the present disclosure provides an apparatus utilizing supercritical water to convert biomass, biomass derivatives, hydrocarbons, and organic wastes to produce a gaseous fuel rich in hydrogen. In an embodiment, the apparatus includes a pressure vessel, with a concentric liner of an insulating material. The insulating liner provides a separate cooling loop to circulate high temperature or supercritical water through an annular space between the outside of the insulating concentric liner and the inside of the pressure vessel wall. In any one or more aspects, the water pressure in the annular space can be maintained to a pressure approximately equal to the pressure inside the reactor. The temperature of the water in the annular space can be cooler than the water, products and reactants contained inside of the reactor. The water in the annular space can be continuously circulated through a cooler in fluid communication with the annular space. Cooled high pressure water can be returned back into the annular space. In any one or more aspects, the cooling system can maintain a lower design metal temperature of the reactor pressure vessel shell, which in turn allows the designer of the pressure vessel to select common pressure vessel grade carbon steels and allow a thinner wall thickness. The reactor can include a connection where supercritical water is input to the reactor. Said connection can be provided with a thermal sieve for control of thermal stresses in the nozzle. The reactor can also be fitted with a connection to feed raw materials that are conducive to forming hydrogen under the process conditions classified as Supercritical Water Gasification. The apparatus can be equipped with an outlet connection on the reactor for the products to exit the reactor. A bottom drain connection can be provided in the reactor to allow controlled removal of salts, which are insoluble in supercritical water. An additional connection can be connected to the reactor pressure vessel to allow for removal of built up inert material that is mechanically separated from the raw product stream exiting the reactor. An optional connection can be provided to add fuel and oxidizers to further boost the temperature inside the reactor.

A second distinct but intergraded apparatus to recover the thermal energy (typically described as the high temperature recuperative heat exchanger) in the raw product exiting the reactor and transferring said thermal energy to the feedwater stream can be used to feed the supercritical water reactor described above. The second pressure vessel can house a shell and conduit heat exchanger, where the shell of said heat exchanger can be a concentric liner of an insulating material that is cooled using the same cooling strategy as utilized by the supercritical gasification reactor described above. The apparatus allows the designer of the second pressure vessel the same benefits of a lower cost pressure vessel grade carbon steel combined with a lower wall thickness.

The present disclosure provides a reactor pressure vessel used to contain high temperature supercritical water for the purpose of maintaining an environment conducive for the supercritical water gasification of carbonaceous feed material, where the pressure vessel shell is protected from the high internal temperature with an internal thermal shield. The thermal shield can be cooled with supercritical water that flows between the interstitial space between the outside of the thermal shield and the inside diameter of the pressure vessel (aka cooling stream). The supercritical cooling stream used can be near the pseudocritical temperature of water and wherein the density of water changes rapidly with respect to temperature and promotes natural circulation of the cooling stream from the density differential between the cold leg and the cooling water being heated as it rises in the interstitial space between the thermal shield and pressure vessel inner shell.

The present disclosure also provides an auxiliary cooling heat exchanger, located near to the top, or above the reactor pressure vessel to reject heat that was exchanged into the cooling stream as the cooling stream gained heat transferred through the thermal shield while the cooling stream was inside the reactor pressure vessel. The cooler and denser supercritical cooling water exits the auxiliary cooling heat exchanger and flows into a stand conduit that leads to the bottom of the reactor and replenishing the cooling circuit.

The present disclosure also provides an inlet dry-well nozzle connection attached to the reactor pressure vessel, used to feed high temperature supercritical feedwater which is of sufficient length to mitigate stresses in the outer conduit material induced by large temperature differentials. The high temperature feedwater flows inside an inner thin walled conduit, and passes through the pressure vessel wall, and thermal shield to feed the reactor pressure vessel. The interstitial volume between the other nozzle and inner feedwater conduit is charged with a high pressure inert gas that has a low thermal conductivity.

A temperature sensor array may be located inside the thermal shield to indicate the supercritical water thermal profile at the bottom of the reactor.

The present disclosure also provides an nozzle connection located at the bottom of the reactor that is in fluid communication with the supercritical water located inside the thermal shield, and which said nozzle has the dual function to allow the reactor bottom to be drained of unreacted sediments and to serve as an inlet nozzle connection for the supercritical cooling water for cooling the thermal shield.

The present disclosure also provides a nozzle connection attached to the reactor pressure vessel and used to feed a carbonaceous material to react with the supercritical water. The feed source can be highly compressed gas, a high pressure liquid or high pressure slurry. The connection extends through the reactor pressure vessel and the high temperature thermal shield.

The present disclosure also provides a nozzle or multiple nozzle connections attached to the lower part of the reactor pressure vessel used to introduce both concentrated oxygen and a fuel to boost the supercritical water temperature inside the reactor for the purpose of increasing both the reaction rate of the supercritical water with the carbonaceous feedstock, while also promoting the formation of a higher mole fraction of hydrogen in the product. Both the oxygen and fuel are kept separate until both substances pass through the reactor pressure vessel wall and the thermal shield.

The present disclosure also provides a pressure vessel that receives high pressure and temperature product exiting the reactor that uses an internal thermal shield to function as both the shell of a shell and conduit heat exchanger and as an internal thermal shield to protect the pressure vessel shell from exposure to excessive temperature. The heat exchanger functions as an ultra-high temperature recuperative heat exchanger. Heat exchanged in the shell and conduit heat exchanger is between the product exiting the hotter supercritical water gasification reactor and the cooler feedwater that is used as make up water to the supercritical water. The thermal shield can be is cooled with supercritical water that flows between the interstitial space between the outside of the thermal shield and the inside diameter of the pressure vessel (aka cooling stream). The supercritical cooling water used can operate near the pseudocritical temperature where the density of the water changes rapidly with temperature and promotes natural circulation of the cooling water.

The present disclosure also provides an auxiliary heat exchanger, located near the top, or above the recuperative heat exchanger pressure vessel to reject heat exchanged into a cooling stream as the cooling stream gained heat transferred through the thermal shield while the cooling stream was inside the product high temperature heat exchanger vessel. The cooler and denser supercritical cooling stream exits the heat exchanger and flows into a stand conduit that leads to the bottom of the pressure vessel shell and replenishing the cooling circuit.

Other apparatus, systems, methods, features, and advantages of the present disclosure of an apparatus for supercritical water gasification will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings like reference numerals designate corresponding parts throughout the several views.

FIG. 4 depicts a cyclonic separator located in the upper part of the supercritical reactor of FIG. 1 in accordance with some embodiments of the present disclosure.

FIG. 7 depicts a cross-sectional view of a pressure seal closure which can be used on both ends of the reactor and the recuperative heat exchanger in accordance with some embodiments of the present disclosure.

FIG. 9 depicts a cross-sectional view of a feed port that can inject both an oxidizer and fuel to boost the internal reactor temperature in accordance with some embodiments of the present disclosure.

FIG. 10 depicts a cross-sectional view of a dry-well and thermal sleeve on the lower section of the recuperative heat exchanger in accordance with some embodiments of the present disclosure.

FIG. 11 depicts a cross-sectional view of the upper half of the recuperative heat exchanger and the inlet feedwater thermal sleeve and dry-well nozzle including the product outlet nozzle connection in accordance with some embodiments of the present disclosure.

FIG. 12 depicts a dry well seal and coupling mechanism in accordance with some embodiments of the present disclosure.

FIG. 13 depicts a dry well seal and coupling mechanism in accordance with some embodiments of the present disclosure.

FIG. 14 and section A-A are cross sectional views of radial coolant distributors that can be utilized in both the supercritical water reactor and high temperature recuperative heat exchanger.

FIG. 16 is a plot of partial derivative of water density dividend by the partial derivative of the temperature evaluated at constant pressure versus temperature.

DETAILED DESCRIPTION

Figure 1:
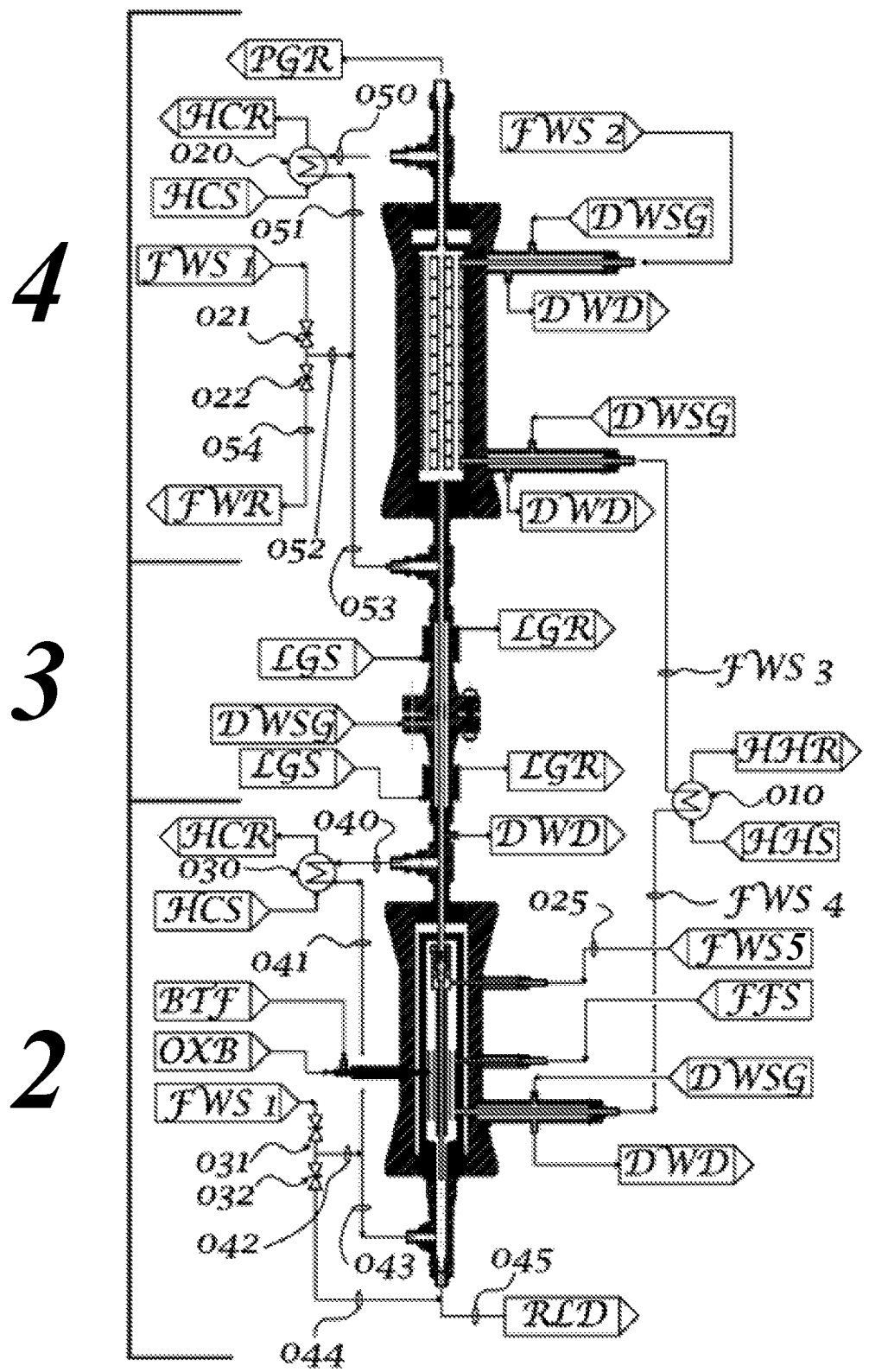
FIG. 1 depicts a supercritical gasification system in accordance with some embodiments of the present disclosure.

Described below are various embodiments of the present systems and apparatus for supercritical water gasification. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° F., and pressure is in psia.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

I. Supercritical Fluid Gasification System

FIG. 1 illustrates a supercritical fluid gasification system 1 in accordance with some embodiments of the present disclosure. Referring to FIGS. 1-14, the supercritical fluid gasification system 1 includes a reactor 2, a recuperative heat exchanger 4, and a coupling conduit 3 that places the reactor 2 in fluid communication with the heat exchanger 4.

Figure 6:
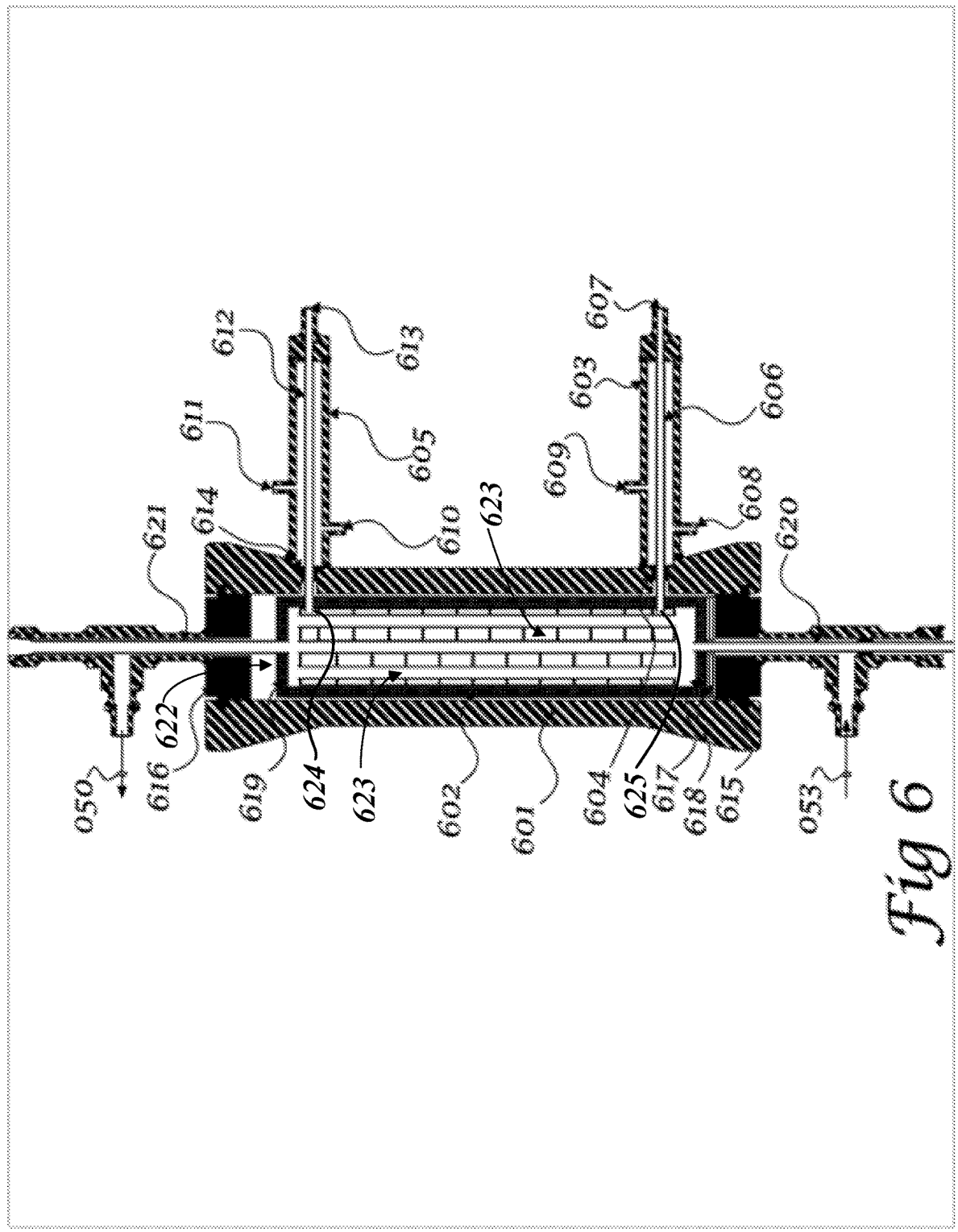
FIG. 6 depicts a cross-sectional view of a recuperative heat exchanger of FIG. 1 in accordance with some embodiments of the present disclosure.

Referring to FIGS. 6 and 10-11, in some embodiments, the heat exchanger 4 includes a pressure vessel shell 601 having sidewalls that extend between a top pressure seal closure 616 and a bottom pressure seal cover 615. The pressure vessel shell 601 and covers 616, 615 enclose a pressure vessel channel 622 within the pressure vessel shell 601. The pressure vessel channel 622 may be an elongate void extending through the pressure vessel shell 601. In some embodiments, the pressure vessel shell 601 has a cross-sectional shape that includes, but is not limited to, an ellipse, circle, oval, ovoid, square, or rectangular.

In some embodiments, a heat exchanger thermal shield 602 is disposed within the pressure vessel shell 601. The thermal shield 602 has sidewalls that extend between a thermal shield top cover 619 and a thermal shield bottom cover 617. The sidewalls of the thermal shield 602 and covers 619, 617 enclose a heat exchanger thermal shield channel 623 within the thermal shield 602. The channel 623 may be an elongate void extending through the thermal shield 602. The thermal shield 602 may have a cross-sectional shape that includes, but is not limited to, an ellipse, ellipsoid, circle, square, or rectangular.

In some embodiments, the thermal shield 602 includes a "shell and tube heat exchanger." For example, the thermal shield 602 may include a shell 1007 disposed within the heat exchanger thermal shield channel 623. The shell 1007 includes an inlet 624 for receiving supercritical feedwater, an outlet 625 for dispensing the heated supercritical feedwater, and an internal channel 626 in fluid communication with the inlet 624 and the outlet 625. The thermal shield 602 includes heat exchanger conduits 1004 that extend through the internal channel 626 of the shell 1007. The outer surface of the heat exchanger conduits 1004 may contact the fluid traveling through the internal volume 626 of the shell 1007 facilitating heat transfer between the streams. The heat exchanger conduits 1004 are placed in fluid communication with a product stream exiting the reactor 2, and an internal volume of the shell 1007 is placed in fluid communication with a supercritical feedwater inlet conduit (FWS2). The shell 1007 encloses the internal volume that prevents the supercritical fluid from mixing with the product stream in the heat exchanger conduits 1004, but facilitates the heat transfer between the two streams.

In some embodiments, the FWS2 places the internal volume of the shell 1007 in fluid communication with a supercritical feedwater source (not shown). In some embodiments, the temperature of the supercritical feedwater in the FWS2 ranges from 800° F. to 875° F. In some embodiments, the temperature of the supercritical feedwater in the FWS2 is at least 800° F., or at least 810° F., or at least 820° F., or at least 830° F., or at least 840° F., or at least 850° F., to less than 860° F., or less than 870° F., or less than 875° F.

In some embodiments, the pressure of the supercritical feedwater in the FWS2 conduit ranges from 3200 psia to 5000 psia. In some embodiments, the pressure of the supercritical feedwater in the FWS2 is at least 3200 psia, or at least 3400 psia, or at least 3600 psia, or at least 3800 psia, or at least 4000 psia, to less than 4200 psia, or less than 4400 psia, or less than 4600 psia, or less than 4800 psia, or less than 5000 psia.

In some embodiments, the product stream in the recuperative heat exchanger 4 heats the supercritical feedwater to a temperature from 925° F. to 1250° F., which exits the recuperative heat exchanger 4 in a supercritical feedwater exit conduit (FWS3). In some embodiments, the recuperative heat exchanger 4 heats the supercritical feedwater to a temperature of at least 925° F., or at least 950° F., or at least 975° F., or at least 1000° F., or at least 1050° F., or at least 1075° F., or at least 1100° F., or at least 1125° F., or at least 1150° F., to less than 1175° F., or less than 1200° F., or less than 1225° F., or less than 1250° F.

In some embodiments, the product stream enters the recuperative heat exchanger 4 at a temperature from 1000° F. to 1400° F. In some embodiments, the product stream exists the reactor 1 and/or enters the recuperative heat exchanger 4 at a temperature of at least 1000° F., or at least 1050° F., or at least 1100° F., or at least 1150° F., or at least 1200° F., to less than 1250° F., or less than 1300° F., or less than 1350° F., or less than 1400° F.

In some embodiments, the product stream is cooled to a temperature from 875° F. to 1000° F. In some embodiments, the product stream is cooled to at least 875° F., or at least 900° F., or at least 925° F., to less than 950° F., or less than 975° F., or less than 1000° F.

In some embodiments, the heated supercritical feedwater exiting the recuperative heat exchanger 4 through FWS3 is placed in fluid communication with a process heater 10. The process heater 10 includes an inlet configured to receive the supercritical feedwater from the FWS3.

The process heater 10 is configured to add heat to the supercritical water heating it to a temperature from 1000° F. to 1400° F. In some embodiments, the process heater 10 is configured to heat the supercritical feedwater to a temperature of at least 1000° F., or at least 1050° F., or at least 1100° F., or at least 1150° F., or at least 1200° F., to less than 1250° F., or less than 1300° F., or less than 1350° F., to less than 1400° F. The process heater 10 includes an outlet configured to dispense the supercritical feedwater to a supercritical feedwater reactor conduit (FWS4).

An exit temperature of 1400° F. is not intended to be a limitation herein, but rather can be an upper limit imposed by the materials of construction and the current state of the art of metallurgical science. Process heat exchanger 10 includes an inlet configured to receive heat from a heat supply flow stream (HHS). In some embodiments, the HHS is hot gas and/or liquid metals. In the case of hot gas, the heat from the combustion of fuel can be used. The fuel may be from the byproducts in the production of hydrogen, mainly methane. The HHS may transfer heat to the supercritical feedwater in the process heat exchanger 10, and exit the process heat exchanger 10 as a high temperature heat return (HHR). Both the HHS and HHR temperatures are greater than the supercritical feedwater in the FWS4 and the FWS3, respectively. The supercritical feedwater in FWS4 is placed in fluid communication with the reactor 2.

Figure 2:
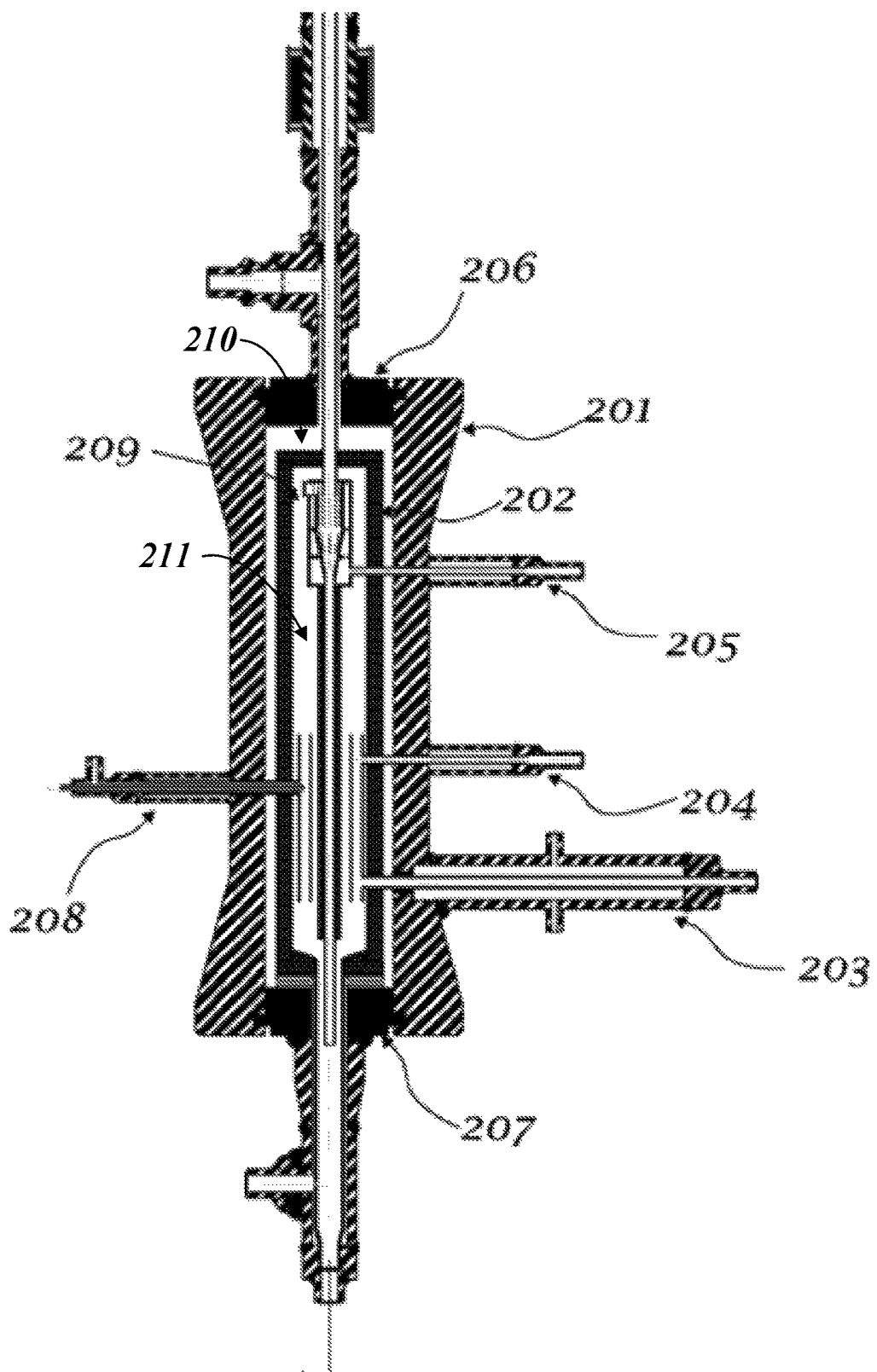
FIG. 2 depicts a cross-sectional view of a reactor of FIG. 1 in accordance with some embodiments of the present disclosure.

Referring to FIGS. 1-2, the reactor 2 includes a reactor shell 201 that forms sidewalls which extend between a top pressure seal cover 206 and a bottom pressure seal cover 207. The sidewalls of the reactor shell 201 and the pressure seal covers 206, 207 enclose a reactor shell channel 210 within the reactor 2. The reactor shell channel 210 may be an elongate void extending through the reactor 2. The reactor shell channel 210 may have a cross-sectional shape including, but not limited to, an ellipse, oval, ovoid, circle, square or rectangle.

In some embodiments, a reactor thermal shield 202 is positioned within the channel reactor shell channel 210 of the reactor shell 201. In some embodiments, the thermal shield 202 forms sidewalls that extend between a bottom cover 338 and a top cover 404. The sidewalls of the thermal shield 202 and covers 338, 404 enclose a thermal shield channel 211 within the thermal shield 202.

The channel 211 may be an elongate void extending through the thermal shield 202. The channel 21 may have a cross-sectional shape including, but not limited to, an ellipse, oval, ovoid, circle, square or rectangle. In some embodiments, the thermal shield 202 is separated from the reactor shell 201 by a space (e.g., annular space).

The thermal shield 202 is in fluid communication with a fluid feed supply conduit (FFS). The FFS may supply a carbonaceous fuel stream to the channel 211 of the thermal shield 202 from a carbonaceous fuel source (not shown). The carbonaceous fuel stream may comprise a carbonaceous fuel and a carrier. In some embodiments, the carrier is a slurry, liquid, or compressed gas that facilitates the transport of the carbonaceous fuel to the channel 211. The carbonaceous fuel stream enters the thermal shield 202 and reacts with the supercritical feedwater provided from the FWS4 to form a product stream. The product stream comprises water, hydrogen, methane, and carbon dioxide.

Suitable carbonaceous fuels include, but are not limited to, biomass, fossil fuel, waste derived fuel, and combustible gases will produce some hydrogen, and combinations thereof. In some embodiments, the carbonaceous fuel is a solid material that has been chipped, pulverized or digested. In some embodiments, the carbonaceous fuel includes a combination of size reduction and digestion in high temperature hot water takes place prior to feeding the mixture into the supercritical reactor. The combination of size reduction and digestion can improve the reaction rates in the supercritical water reactor and can reduce the reactor size.

In some embodiments, the carbonaceous fuel stream is heated to a temperature from 550° F. to 700° F. In some embodiments, the carbonaceous fuel stream is at a temperature of at least 550° F., or at least 575° F., or at least 600° F., or at least 625° F., to less than 650° F., or less than 700° F. In some embodiments, the carbonaceous fuel stream has a pressure in the FFS that is greater than a pressure of the reactor 2.

In some embodiments, the carbonaceous fuel stream comprises carbonaceous fuel in an amount from 10 weight percent (wt %) to 50 wt %, based on the total weight of the carbonaceous fuel stream. In some embodiments, the carbonaceous fuel stream comprises at least 10 wt % carbonaceous fuel, or at least 15 wt %, or at least 20 wt %, or at least 25 wt %, or at least 30 wt %, or at least 35 wt %, to less than 40 wt % or less than 45 wt %, or less than 50 wt %.

Referring to FIG. 1, the supercritical fluid gasification system 1 includes a coupling conduit 3 to place the reactor 2 in fluid communication with the recuperative heat exchanger 4. In some embodiments, the coupling conduit 4 can facilitate the assembly and disassembly of the overall system 1. In some embodiments, the coupling conduit 4 facilitates assembly and disassembly without the need for welding and rigorous inspection of the welds at every maintenance interval.

In some embodiments, the coupling conduit 4 includes an outer coupling shell 501. The outer coupling shell 501 includes a coupling conduit channel 550. The channel 550 is an elongated void extending through the outer coupling shell 501. In some embodiments, the channel 550 has a cross-sectional shape. The channel 550 may have a cross-sectional shape including, but not limited to, an ellipse, oval, ovoid, circle, square or rectangle.

In some embodiments, a product conduit 410 extends through a portion of the channel 550 within the outer coupling shell 501. The product conduit 410 is in fluid communication with the channel 550 of the thermal shield 202. The product conduit 410 extends to a coupling 523 that couples the product conduit 410 to a heat exchanger inlet conduit 620. The heat exchanger inlet conduit 620 extends from the coupling 520 to the thermal shield 602, and places the product stream in fluid communication with the channel 550 in the thermal shield 602 and the product conduit 410. The product conduit 410 and the heat exchanger inlet conduit 620 may be spaced from the sidewalls of the outer coupling shell 501.

The reactor 2, coupling conduit 3, and the heat exchanger 4 are described in further detail below.

II. Reactor

With reference to FIG. 2, a close-up cross-section of the reactor 2 is shown. In some embodiments, the reactor shell 201 is designed for the high operating pressure, but at a temperature that is below that of the mixture contained inside the thermal shield 202. The sidewalls of the reactor shell 201 can be covered by the top pressure seal cover 206, and the bottom pressure seal cover 207.

In some embodiments, the reactor shell 201 is composed of a metal. The metal may withstand temperatures from 700° F. to 775° F. Suitable metals for the reactor shell 201 include, but are not limited to, carbon steel.

In some embodiments, the thermal shield 202 can provide resistance to heat transfer from the hotter fluid inside the thermal shield 202. In some embodiments, the thermal shield 202 material properties can include both a low coefficient of thermal expansion and a low thermal conductivity. The low coefficient of thermal expansion reduces thermal stresses in the reactor thermal shield. The low thermal conductivity reduces heat losses from both the reactor and the recuperate heat exchanger and protecting the pressure vessel steel from higher temperatures and exposure to hydrogen contained in the product. The hydrogen produced in the reaction can cause embrittlement of the lower cost carbon steel used to fabricate the reactor and heat exchanger vessels.

In some embodiments, the thermal shield 202 includes one or more metal oxides, such as zirconia and alumina. In some embodiments, the thermal shield 202 is composed of a glass material comprising from 90 wt % to 98 wt % silica and from 2 wt % to 10 wt % boron trioxide. In some embodiments, the thermal shield 202 is composed of a glass material comprising at least 90 wt % silica, or at least 91 wt %, or at least 92 wt %, or at least 93 wt %, or at least 94 wt %, to less than 95 wt %, or less than 96 wt %, or less than 97 wt %, or less than 98 wt % silica. In some embodiments, the thermal shield 202 is composed of a glass material comprising from 2 wt % to 10 wt % boron trioxide. In some embodiments, the thermal shield 202 is composed of at least 2 wt % boron trioxide, or at least 3 wt %, or at least 4 wt %, or at least 5 wt %, to less than 6 wt %, or less than 7 wt %, or less than 8 wt %, or less than 9 wt %, or less than 10 wt %.

Non-limiting example materials include fused silica (e.g., 99-100 wt % silica), and a consolidated, high-silica, high-temperature, reconstructed glass such as Corning Vycor™ (Corning glass ID 7913). Both materials are similar in composition and are greater than 96% $SiO_2$ in overall composition, although their manufacturing methods are different. In one non-limiting example embodiment, the thermal shield 202 is composed of a consolidated, high-silica, high-temperature, reconstructed glass having a composition of: $SiO_2$—96.3 wt %; $B_2O_3$—2.95 wt %; $Na_2O$—0.04 wt %; $Al_2O_3$ and $ZrO_2$—0.72 wt %; and balance others to 100 wt %, wherein wt % is based on the total weight of the composition.

The reactor thermal shield can either be a monolithic cylinder section with separate top covers and a bottom closure. Rather than a monolithic cylinder section, the reactor thermal shield can also be assembled from a stack of shorter cylindrical sections, as the boundary between the reactor thermal shield and inner core of the reactor need not be leak tight.

With reference to FIG. 2, a supplemental feedwater conduit FWS1 can supply feedwater to facilitate cooling of the reactor 2. In some embodiments, the FWS1 includes water at a pressure in a range from 2% to 20% greater than the reactor 2. The temperature of fluid within FWS1 can be 550° F. to 700° F. The FWS1 can supply adjustable valves 031 and 032 with water, and work in tandem to split the flow into conduits 042 and 044 and optimize the pressure and flow of make-up water to the thermal shield cooling water loop. The pressure of streams 041, 042 and 043 can be 0.01% to 1% greater than the reactor 2 internal pressure.

Stream 045 is in fluid communication with a reactor liquid drain (RLD). Unreacted solids that settle at the bottom of the reactor 2 can be removed as slurry to prevent build-up of solids in the reactor. Stream 025 is in fluid communication with the FWS1 and supplies feedwater. In some embodiments, the feedwater temperature is supplied at a temperature equal or approximately equal to the temperature of the reactor shell 201 to limit thermal stress at the nozzle to pressure vessel connection. In some embodiments, conduit 045 is activated to flush a cyclonic separator 209.

In some embodiments, the system 1 includes a coolant supply conduit (HCS) and a heat exchanger 030. The coolant supply conduit (HCS) can be in fluid communication with an inlet of the heat exchanger 030 and can remove heat that is gained by heat transferred through the thermal shield 202 inside the reactor. After increasing in temperature, the fluid provided by the HCS can exit the heat exchanger 030 through the coolant return conduit (HCR). The temperature of both the HCS and the HCR can be less than the water temperature flowing into and out of heat exchanger 030 through conduits 040 and 041.

In some embodiments, the coolant is a gas or liquid, and can include water or steam. In some embodiments, the HCS and the HCR can be at a temperature from 575° F. to 715° F. In some embodiments, the pressure of the HCS and HCR can be a function of the coolant liquid or gas used. In some embodiments, the temperatures for conduits 040 and 041 can range from 725° F. to 775° F.

In some embodiments, cooling of the annular space between the outside of the thermal shield 202 and the inside of the reactor shell 201 can be achieved by circulation of water from flow stream 043 that enters a nozzle below the reactor lower cover 207. Cooling circulation can result from the water density difference between the water column outside the reactor in conduits 041 and 043 and the water in the annular space between the inside of the reactor shell 201 and the outside of the thermal shield 202. By managing the process temperatures with heat exchangers 020 and 030 and by proper hydraulic design of the cooling fluid flow path, a continuous cooling flow can be induced without the need of a pump. The required head pressure to overcome hydraulic resistance can be provided by the average density differences between the cooler water column in the piping carrying flow stream 041 and 043 and the water that is heated by heat flow through the thermal shield 202. The differential pressure can be enhanced by taking advantage of the changing density of water near the pseudo critical temperature.

Figure 15:
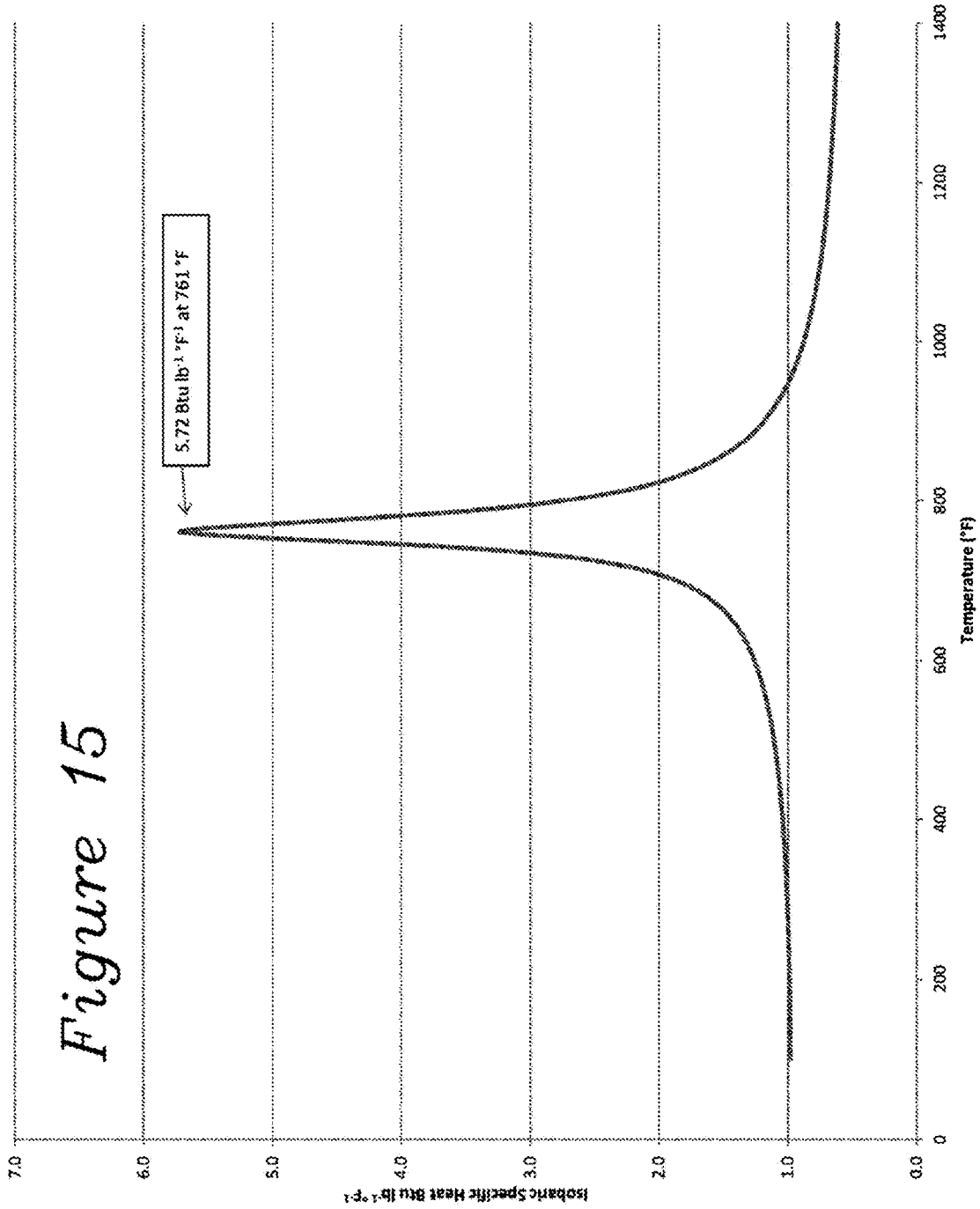
FIG. 15 is a plot of the isobaric specific heat content (Cp) of water versus temperature at a constant pressure equal to 4500 psia.

The physical properties of water at a pressure of 4500 psia are shown in FIG. 15 and FIG. 16. FIG. 15 is a plot of temperature versus the isobaric specific heat content of water. At temperatures near ambient conditions, liquid phase water has isobaric specific heat (Cp) content at or near 1.0 $Btu/lb_m/°F$. At a pressure of 4500 psia, and a temperature of 761° F., the isobaric specific heat peaks sharply to 5.72 $Btu/lb_m/°F$. At temperatures above this peak, the physical properties of water are more similar to high pressure steam and at temperatures below the peak the physical properties are more similar to liquid water.

FIG. 16 is a plot of temperature versus the rate of density change of water. The isobaric specific heat content peak closely coincides with the peak in the change of density. Two density points are labeled on FIG. 16 at 725° F. and 775° F., with corresponding densities of 32.26 $lb_m/ft^3$ and 16.47 $lb_m/ft^3$ respectively.

The aforementioned temperatures and densities are not intended to be the exact specification for natural circulation, but rather an exemplary temperature range of 650° F. to 750° F. exiting heat exchanger 020 to flow stream 041 and 760° F. to 800° F. of the water exiting the natural circulation loop nozzle as flow stream 040.

In some embodiments, cooling in the recuperative heat exchanger 3 can be achieved with a circulation cooling loop that operates at conditions similar to the reactor 2 cooling loop, where the temperature of stream 040 is approximately equal to stream 050, and steam 041 water temperatures are approximately equal to 051.

With reference to FIG. 2 nozzle 204 provides a connection to supply the supercritical water reactor 2 with a carbonaceous liquid, compressed gas or biomass slurry feed. Examples of liquid feed stock can include liquefied propane, or fuel oils. Examples of compressed gases include natural gas or compressed digester gases. When operated with fossil fuels the reactor 2 produces a hydrogen rich product similar to current day methane reforming processes utilized by most producers of commodity grade hydrogen market. The temperature of the liquid, compressed gas or slurry feed can be between 550° F. and 650° F.

With this supply temperature range, nozzle 204 can be designed without a dry-well and can be open to the cooling water circuit between the reactor thermal shield and reactor pressure vessel shell. Supply water temperatures to a transpiring wall cyclonic separator 209 can also be between 550° F. and 725° F. and can also not require a dry-well and will not require any seals.

Nozzle 203 provides high temperature supercritical water. An advanced design can be employed to moderate thermal stresses down the axial length of the nozzle. Nozzle 203 is further described in FIG. 8. Nozzle 205 is in fluid communication with conduit 25 from the FWS1.

The supercritical water reactor apparatus can contain provisions for removal of solids from the bottom of reactor. Solids can be in a form of minerals that do not contribute to the chemical reactions or unreacted carbon, both substances originating from the carbonaceous slurry feed to the supercritical water reactor. Solids can either fall out of suspension in the reaction zone of the supercritical water reactor, or be flushed out of the transpiring wall cyclonic separator 209 and down the drain conduit to the bottom of the reactor.

Figure 3:
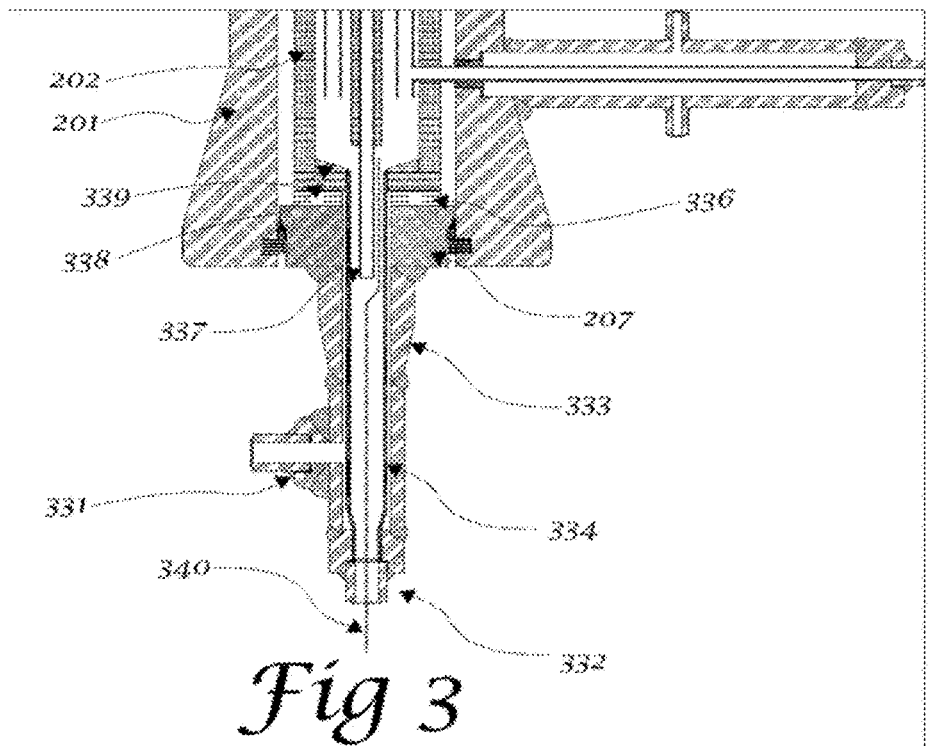
FIG. 3 depicts a cross-sectional view of the a nozzle connection to the reactor of FIG. 1 in accordance with some embodiments of the present disclosure.

With reference to FIG. 3, cooling water enters nozzle 331 from conduit 43, and flows upwards through the annular space between the reactor 2 lower drain nozzle 333 and a solids removal conduit 334. The lower reactor cover 207 is connected to nozzle 333. Solids removal conduit 334 can be a mechanical interference fit in reactor liquid drain RLD and nozzle 332 to prevent cross contamination of solids into the cooling circuit.

When the cooling water reaches the close tolerance fit barrier between the bottom cover 338 of the thermal shield 202, and the solids removal conduit 334, the cooling flow can be forced through at least one radial distributor 336 opening. The radial distributer is further detailed in FIG. 14. Upon exiting the radial distributor, the cooling water flows upwards in the annular space between the reactor shell 201 and the reactor thermal shield 202.

To reduce heat losses, bottom cover 338 can be made of the same material as the thermal shield 202. Solids that do not participate in any of the relevant chemical reactions for the most part will fall out of suspension inside the supercritical reactor thermal shield 202 or can be separated from the product steam in the transpiring wall cyclonic separator 209, which is described in regards to FIG. 4. Solids flushed from the transpiring wall cyclonic separator 209, flow down drop conduit 337. Solids that drop out of suspension prior to the cyclonic separator fall by gravity to the sloped reactor floor 339 and then down drop conduit 334.

Given that the supercritical water reactor inner reaction zone loses some heat through the thermal shield 202, the bottom of the reactor 2 can have a decreasing temperature gradient in a downward direction. Since water pressures are greater than the critical pressure no liquid/vapor boundary exists to base an accurate liquid level on. Temperature sensing array 340 with multiple sensing junctions can provide information with respect to establishing an optimal reactor liquid drain RLD and flow out of nozzle 332.

The reactor liquid drain RLD flow can be subject to several constraints. First, preferably the solids level should not be allowed to accumulate to a high level and cause the reactor liquid drain piping to plug. With reference back to FIG. 1, flow steam 044 can be adjusted with valve 032 to prevent excessive solids to liquid ratios. A second constraint can be maintaining a volume of higher density water at the bottom of the reactor by analysis of the temperatures from temperature array 340. It is known by individuals skilled in the art of the physical properties of gases and liquids that fluids in the liquid phase can transport solids more effectively. With a reactor operating pressures of at least 3500, 4000, 4500, and 5000 psia, the temperature at which the isobaric specific heat content peaks at a temperature of 719° F., 741° F., 761° F., 779° F. respectively.

This point is often referred to as the pseudocritical temperature. At temperatures below the pseudocritical temperature, the water density increases rapidly thereby improving the ability of fluid mixture to drain unreacted solids from the bottom if the reactor.

With reference to FIG. 4, a cyclonic separator 209 with transpiring walls can be located in the upper portion of the thermal shield 202 to remove suspended particulate matter from the product exiting the reactor 2. The cyclonic separator 209 can be completely enclosed in a partitioned housing 441. The housing 441 includes cyclone walls that extend from a top end and a bottom end. The top end of the housing 441 may be placed in fluid communication with the product conduit, and the bottom end may be placed in fluid communication with a drain conduit 448. In some embodiments, at least a portion of the cyclone walls taper inwardly towards the bottom end of the housing 441. Supercritical water combined with reaction products enters tangential inlet nozzle 442. Solids are spun against the inner wall of the cyclonic separator 401, while the product gas mixture enters reactor outlet product conduit 410. Solids flow by gravity to a bottom surface 446 of the cyclonic separator 401, and down drain conduit 448. The drain conduit 448 can be significantly cooler than the fluid inside the reactor 2, is fitted with a tubular section of thermal shielding material 447 to reduce undesirable heat transfer.

Solids in this environment have the potential to stick and over time may foul the inner wall of the cyclonic separator 401. The inner wall 443 of the cyclonic separator 401 can be porous. High pressure flushing water from flushing supply line 405 inside nozzle 205 enters into the cyclonic enclosure 441. The source of the flushing water from the FWS1 can be stream 025. At low flushing water flows, the high pressure subcritical water can be confined to the lower section of the cyclonic separator, below partition 445.

In some embodiments, the outlets of the cyclonic separator 401 and drain conduit 448 are flushed. By partitioning the volume between the inner cyclone and the cyclonic enclosure with control orifices integral to the partitions, the impacts to the final product can be minimized. If more severe internal fouling of the cyclonic separator occurs, higher flushing flows will pass through the lower partition nozzle 448 pressurizing the central section of the enclosure to flush the cone section of the cyclonic separator. At the maximum flushing flow water passes through upper orifice 449 in partition 444 and pressurizing the upper section 443 transpiring wall and flushing the entire cyclonic separator. This degree of flushing can have the potential for the greatest degree of thermal shock and may need to be accompanied by reducing the process temperatures and production to reduce the mechanical stresses in the apparatus due to thermal shock.

Thermal shield 202 top cover 404 fits on the top of the cylindrical section of the thermal shield 202. The mating surfaces of the cylindrical section and cover do not need to provide a leak tight barrier as the pressure differential between the two spaces is minimal, and process impacts are negligible. The tolerances between thermal shield 202 top cover 404 and product conduit 410 can consider differential thermal expansion rates and operating temperatures so that a minimal amount of clearance is maintained at all times. Hard contact between the metal conduit and glass thermal shield material may fracture the cover. Leakage between the clearances is tolerable for the same reasons described herein.

Flush water supply conduit 405 can pass through an oversized opening in reactor shell 201. With flushing water temperatures approximately equal to the reactor shell temperatures in the annular space between the reactor shell 201 and the thermal shield 202, water inside the annular space between flushing port nozzle 205 and flushing water supply conduit 405 are relatively close in temperature, can have low thermal stresses, and therefore no thermal sleeve is required. The pressure difference between the flushing water in conduit 405 and the water in the annular space inside nozzle 205 can be minimal allowing a thin wall conduit specification to be selected.

III. Coupling Conduit

Figure 5:
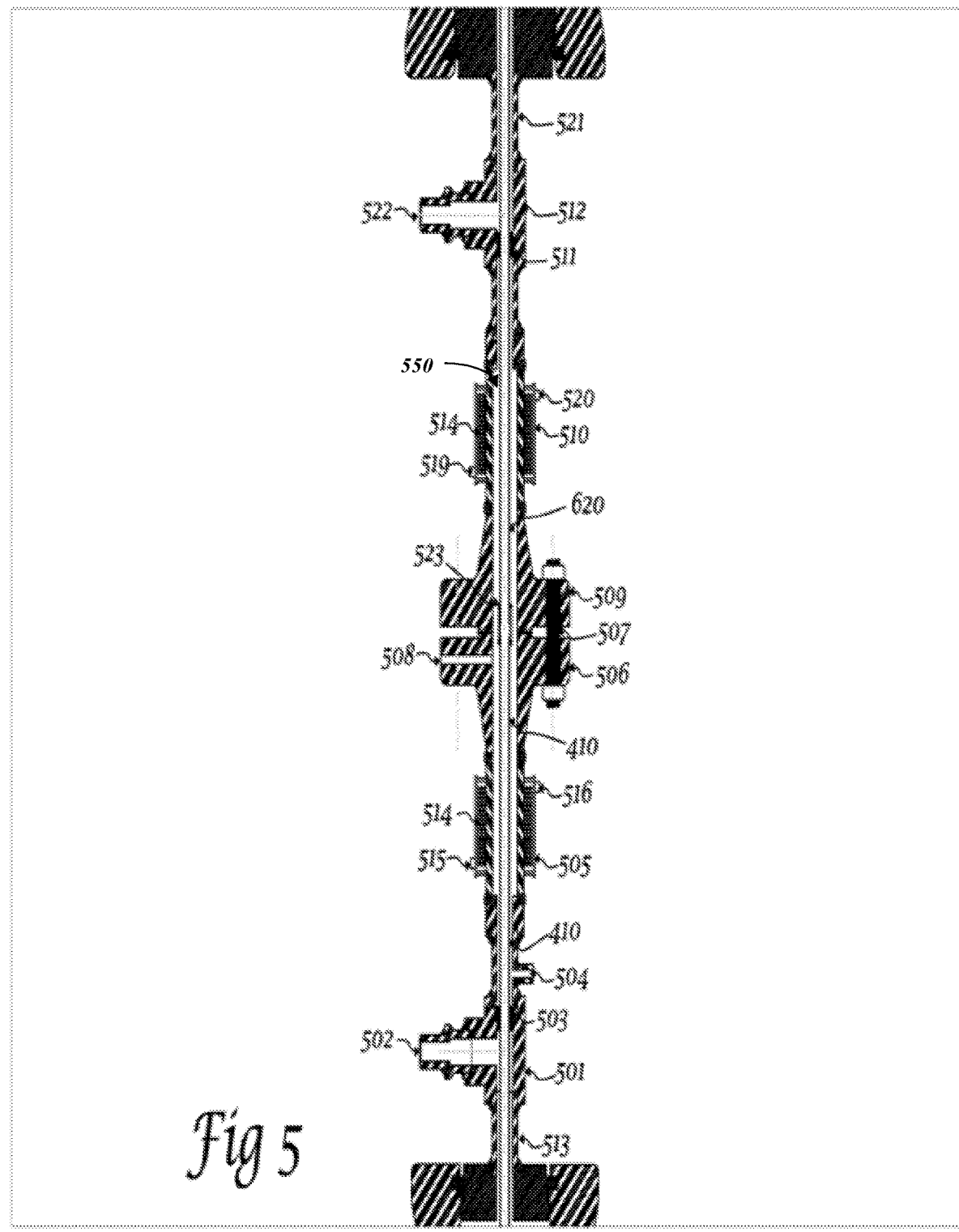
FIG. 5 depicts a cross-sectional view of a coupling conduit of FIG. 1 in accordance with some embodiments of the present disclosure.

Referring to FIG. 5, a coupling conduit 4 is illustrated. In some embodiments, the coupling conduit 3 can be to facilitate the assembly and disassembly of overall system 1 without the need to perform high quality welding and rigorous inspection of the welds at every maintenance interval.

In some embodiments, a low temperature gas supply (LGS) and low temperature gas return (LGR) can be utilized in at two locations in the coupling conduit 4. The temperature of the LGS can be established to maintain a metal temperature of the bolted flange to 650° F. or lower, which is near the upper limit for standardized flange for a 2500 # Class ANSI flange, made from forged carbon steel. Low pressure gas may be supplied at a temperature of 550° F. and can be employed to provide a smooth axial thermal gradient and maintain bolted flange operating temperatures within accepted design limits of a standardized bolted flange.

In some embodiments, a dry-well seal gas supply (DWSG) can be used to pressurize the concentric space between the product conduit 410 and a pressure retaining conduit. The gas pressure can be set just above the supercritical water reactor pressure in a controlled range of 0.04% to 1.0% greater than the pressure of the product exiting the reactor.

In an example of a reactor operating pressure of 4500 psi, the inert dry well gas pressure can be from 4502 psi to 4545 psi. The pressurized gas can serve two purposes. First, the gas can reduce the hoop stress in the product conduit 410 allowing the selection of a thin wall conduit. Second, the gas can provide a degree of thermal insulation, relative to water or supercritical water, therefore reducing the amount of heat loss in the product, or feedwater, as it flows through the dry-well section of the process coupling and all inert gas charged thermal sleeves. The pressure of the dry well gas can be slightly greater than the reactor pressure to assure that small leaks in the drywell seal result in gas leakage into the reactor as opposed to water leaking out of the reactor into the drywell.

Referring back to FIG. 1, flow control valves 021 and 022 can be adjusted in tandem to maintain a pressure in flow stream 051 equal to approximately 0.01% to 1% greater than the high temperature recuperative heat exchanger internal pressure. Flow stream 050 exits the top of the main heat exchanger after gaining heat transferred out of the thermal shield and can be cooled in heat exchanger 20. After cooling the water exits in conduit 051 and blends with makeup water in streams 052, 053 and 054, the mixed streams flow through conduit 053 into a connection located at the base of the recuperative heat exchanger.

Excess water passing through the flow control valve exits the system 1 boundary through flow stream 054 as feedwater reject FWR. Heat exchanger 020 may be provided for identical purpose as heat exchanger 030. Additional information on heat exchanger 020 and the high temperature recuperative heat exchanger 4. High temperature coolant supply (HCS) and high temperature coolant return (HCR) can be utilized in heat exchanger 020 and are preferably the same process fluid used to cool heat exchanger 030.

The coupling conduit 3 can include the outlet nozzle for cooling water that cools the supercritical water reactor thermal shield. This assembly can also include the cooling water inlet nozzle for the high temperature recuperative heat exchanger thermal shield cooling. Product flow inside conduit 410 flows up from the reactor 2 to the recuperative heat exchanger 4. Product temperatures exiting the reactor can range from 900° F. to 1400° F. This temperature can be well above the maximum allowable temperatures for all lower cost pressure vessel quality steel. Supercritical water reactor exit nozzle 513 can be cooled by the heat exchanger 20.

The cooling water can enter the bottom of the reactor 2 in stream 043, and exit nozzle 502 to be cooled in heat exchanger 030. Cooling water flow can be vertically stopped by dry-well seal 503. The annular space between product outlet conduit 410 and all of piping and fittings up to the upper dry-well seal 511 can be filled with a combination of pressurized gas and an optional low density fiber insulation material (not depicted). Gas pressures can be adjusted by either addition or venting gas through port 508. In some embodiments, the gas and insulation reduce both radiative and convective heat loss from the product. If the dry-well gas pressure is near the pressure inside of product conduit 410 the wall thickness of the product conduit can be relatively thin. This in turn reduces the need for high cost specialty alloys.

In addition, if the gas pressure in the dry-well is approximately 0.1% to 1.0% greater than the reactor and recuperative heat exchanger cooling operating pressures, liquid can be prevented from entering the dry-well. In the event of a negative pressure differential excursion between the dry-well seals, liquid phase leakage can be drained through connection port 504.

Upper flange 509 can be bolted 507 to the lower flange 506. Standard high pressure steel flanges have a significant derating in allowable pressure as the flange temperature increases. Thus there can be a design benefit to provide some force cooling of the piping adjacent to the flange. Metallic cooling fins 514 can be fixed to the section of conduit above and below the flanges. The finned section can be enclosed by housings 505 and 510. Low temperatures gas supply (LGS) can be connected to the fin housings 505, 510.

A gaseous media at a supply temperature at ambient temperatures can be supplied to ports 515 and 519. In some embodiments, the gaseous media is air, which may be supplied from a low pressure fan. The flow in the fan housing can be maintained to keep the flange temperature at a range of 300° F. to 500° F. The gaseous media exit ports 516 and 520.

To further facilitate disassembly of the system 1, product conduit 410 can be coupled to recuperative heat exchanger product supply conduit 620 by coupling 523. Product conduit 620 can pass through upper dry-well seal 511 and into the recuperative heat exchanger 4. Cooler dense supercritical water can be provided by heat exchanger 020, which enters nozzle 522. The water can flow through the annular space between tee fitting 512 and conduit 521 into the recuperative heat exchanger 4 lower pressure seal cover 615.

IV. Recuperative Heat Exchanger

FIG. 6 is an illustration of a cross-section of the recuperative heat exchanger 4. In some embodiments, the recuperative heat exchanger 4 recovers thermal energy from the product exiting the supercritical water reactor to preheat incoming feedwater in FWS2 to a temperature as close to temperature of the product temperature entering in conduit 620. This level of heat recovery can reduce the amount of heat required to heat the water in the final heating step in heat exchanger 010 in FIG. 1. This final heating step can be a parasitic heat input that either consumes byproduct gases such as methane and carbon monoxide or other source of energy. To minimize parasitic heat input to the most reasonable extent practical a recuperative heat exchanger 4 that recovers as much heat available in the product flow stream exiting the supercritical water reactor can be utilized.

The thermal performance of a heat transfer process is often characterized by the terminal temperature differential, or TTD. The effectiveness of a heat exchanger is related directly related to the TTD. The TTD can dictate the required amount of heat transfer surface area, as well as the physical size and cost in the design of a heat exchanger. The product temperature entering the recuperative heat exchanger in conduit 620 can be designated at $T_1$. The temperature of the feedwater exiting in conduit 606 through nozzle 607 can be designated as $T_2$. The formula for the terminal temperature differential is $TTD = T_1 - T_2$.

With a large number of both technical and economic factors involved, the TTD can range from 5° F. to 100° F. While additional stages of heat recovery may be utilized between the product gas return (PGR) and (FWS2), of FIG. 1, the heat exchangers are not depicted as the assumption herein is both temperatures are below 1000° F. With temperatures below 1000° F. lower cost materials of construction can be used. With a design highly similar to the supercritical water reactor, the high temperature recuperative heat exchanger can utilize a cooling loop that induces a flow by natural circulation. Water can be cooled to a temperature below the pseudo critical temperature in heat exchanger 020 of FIG. 1. The column of water from the outlet of heat exchanger 020 of FIG. 1 down to the cooling loop inlet nozzle 522 of FIG. 5 and in fluid communication with stream (053) of FIG. 1 can create a static pressure rise that is a function of the liquid density and the height difference.

Cooling water can flow upwards and in the annular space between pressure seal closure cover 615 and product conduit 620. The cooling flow can then enter a radial distributor 618 and flow horizontally into the annular space between the pressure vessel shell 601 and the thermal shield 602. The cooling flow can rise vertically while gaining heat and decreasing in density. The aforementioned heat can flow from the hotter fluids inside the thermal shield and through the thermal shield into the cooling water. The thermal shield material can be identical or equal to thermal shield in the supercritical water reactor 202 of FIG. 2. The cooling water can exit the recuperative heat exchanger through the annular space between the top pressure seal closure 616 and product conduit 621.

The cylindrical section of high temperature recuperative heat exchanger can be closed off at both ends with end covers 617 and 619. The end covers can be manufactured from the same material as the thermal shield.

Nozzle 605 can be welded to pressure vessel shell 601. The length of nozzle 605 can be engineered to provide a gradual thermal gradient and keep stresses due to the thermal gradients in combination with pressure stress within the limits of the appropriate pressure vessel codes. With the FWS2 between 775° F. and 875° F., inlet conduit 613 can be a low or intermediate grade alloy steel. Inlet nozzle 605 can be an equivalent grade of material as the inlet conduit 613. Conduit 612 can be fitted tightly into the reducer section of nozzle 613 and can pass through dry-well seal 614 and can be connected to the outer annular space of the final product pass of the conduit in conduit heat exchanger. The annular volume between feedwater conduit 612 and inlet nozzle 605 can be charged with an inert gas to reduce heat loss from the feedwater conduit. The inert gas pressure can be slightly greater than the fluid pressure of the water in the high temperature recuperative heat exchanger. Nozzle 610 can be connected to a liquid drain in the event liquid can be detected.

The inert gas can be admitted or discharged through nozzle 611 to maintain the optimal pressure. Insulating material, preferably a fibrous low density material, can be placed inside said annular volume to further reduce radiant transfer and convection currents to further impede heat transfer from conduit 612 to nozzle 605. After the final pass of the shell and conduit heat exchanger, the heated feedwater can exit conduit 606 which can pass through dry-well seal 604 enter nozzle 603. Conduit 606 can be mechanically rolled and expanded into nozzle terminal adapter 607. Nozzle 603 can be connected to pressure vessel 601. As previously described for nozzle 605, nozzle 603 can also be engineered to distribute the thermal gradient and the stresses induced by the thermal gradient.

In some embodiments, the temperature of the feedwater exiting the high temperature recuperative heat exchanger can range from 925° F. to 1250° F. The section of nozzle can be attached to nozzle terminal adapter 607 stainless steel or Inconel. The section of nozzle 603 closest to pressure vessel 601 can be a low to intermediate grade material identical or related to material used in nozzle 605. The annular volume between nozzle 603 and conduit 606 can also be charged with an inert gas through port 609 and can originate from the same source connected to port 611, designated DWSG in FIG. 1. The annular volume can also be provided with insulating material previously described for nozzle 605. Nozzle 608 can be connected to the same drain system as nozzle 610, designated as DWD in FIG. 1. Flow streams 050 and 053 are the inlet and outlet streams, respectively, for the cooling system also initially identified on FIG. 1.

All tubular materials of construction in the high temperature recuperative heat exchanger can be selected based on temperature, the ability to resist corrosion and hydrogen embrittlement. The pressure difference between the conduit side and shell side can be in the range of 20 psi to 250 psi. This allows the design of the high temperature recuperative heat exchanger utilizing thin walled heat exchanger tubing which can improve heat transfer while reducing construction costs.

With reference to FIG. 7, a pressure seal vessel end closure is described as an embodiment herein. Alternatively, the pressure vessel ends can also be flanged or welded. Vessel end covers 206, 207, in FIGS. 2 and 615, and 616 in FIG. 6, can be machined to two different radii with a tapered section between the lesser and greater radius. A softer metal ring 701 can be tapered to specific design to deform and provide a tight, leak fee seal. A harder metal backup ring 702 can transfer high forces developed from the internal pressure to segmental thrust ring 703. Segmental thrust ring 703 can comprise approximately 6 to 12 separate pieces to allow installation with the end covers in an over inserted position.

Both ends of pressure vessels 101 and 601 can be machined on both ends to provide a groove for the segmental thrust rings to transfer thrust loads into the pressure vessel shell. Other details and specifications are not further described herein, as the pressure seal end closure is a well-established art and is understood by individuals skilled in the art.

Figure 8:
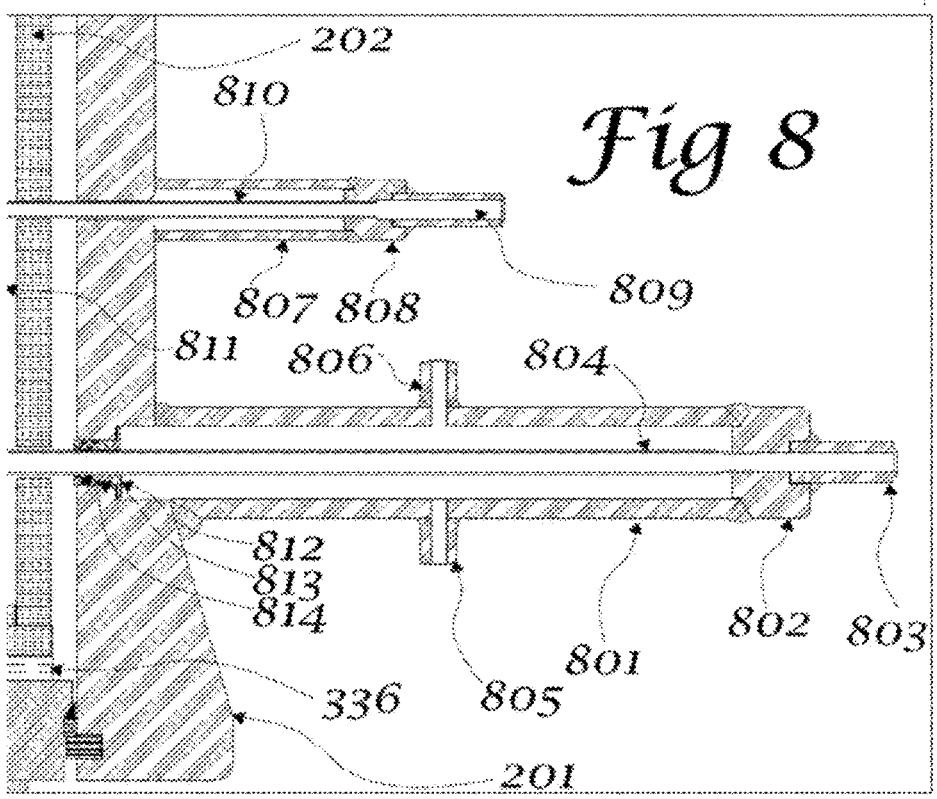
FIG. 8 depicts a cross-sectional view of a dry-well and thermal sleeve nozzle connection to the reactor, and the connection carbonaceous fuel in accordance with some embodiments of the present disclosure.

FIG. 8 is a close-up view of both the fluid feed supply FFS nozzle 204 in FIG. 2 and supplied by conduit 809 connected to terminal adapter 808. Nozzle terminal adapter 808 can be connected to nozzle conduit piece 807 that is attached to the supercritical water reactor pressure vessel shell 201. The fluid feed supply can be transported inside conduit 810 which can be connected on one end to the nozzle terminal adapter 808 and on the other end to chemical reaction zone 811. The size of the opening in the supercritical water reactor pressure vessel can be oversized relative to the outside diameter of the conduit 810. No dry-well seal is needed, and cooling water from within the reactor can fill the annular volume between conduit 810 and nozzle 807. The fluid temperature entering the fluid feed nozzle can be controlled to within a temperature range that does not cause excess mechanical stresses caused by thermal gradients between the nozzle and the supercritical water reactor pressure vessel 202. A thermal sleeve is not required if stresses induced from a temperature gradient contribute nominal additional stresses relative to the pressure induced stress so that the combined stress level is below the maximum allowable stress in the pressure vessel design code utilized.

High temperature feedwater FWS4 at temperatures ranging from 1000° F. to 1400° F. can enter in conduit 803 into nozzle terminal adapter 802. The high temperature water can flow through conduit 804 through dry-well seal 812, and continue on through an opening in the thermal shield and can be connected to a lower connection on the primary reaction zone 811. Nozzle 801 can function as a thermal sleeve for the temperature gradient between the nozzle terminal adapter 802 and pressure vessel 201. The temperature gradient defined in this specific case can be the temperature difference between nozzle 803 and pressure vessel shell 201.

The temperature at the pressure vessel shell can be close the supercritical water reactor vessel temperature, and can be between 725° F. and 775° F. Thus, the temperature gradient of 225° F. to 625° F. can be the expected range in this example. The annular volume between conduit 804 and nozzle 801 can be pressurized with in inert gas at a pressure previously specified herein. The inert gas can be either added or removed through nozzle connection 806 to maintain the optimal working pressure.

The supercritical water can be prevented from entering the drywell with seal 812, 813, 814. Seal body 812 can hold both the outer seals 813 and inner seals 814 in place. The outer seals can be static, in that the seals do not need to move relative to either the reactor vessel 201 or the seal body 812. The inner seals 814 can be subject to axial relative movement between the seal body and feed conduit 804. The relative motion that can occur because the thermal expansion of feed conduit 804 can be different than that of thermal sleeve conduit 801. Connection 805 can be intended to drain liquid leakage or vent excess gas pressure out of the drywell.

With reference to FIG. 9, details of an arrangement of a connection to reactor first illustrated in FIG. 2 as nozzle 208. The function of the arrangement illustrated in FIG. 9 can be to allow the addition of oxygen and a fuel. The oxygen and fuel first can mix inside zone 811 inside the reactor and produce an exothermic reaction to boost the temperature inside the reactor. This feature is not mandatory. It can be implemented to increase reaction rates and the hydrogen mass fraction in the final product.

Relatively pure oxygen in fluid communication with OXB of FIG. 1, at a pressure slightly greater than the pressure inside the reactor, can be supplied at a controlled flow rate to nozzle 901. The oxygen can flow through conduit 906 into reaction zone 811. Fuel in fluid communication with BTF of FIG. 1, at pressure slightly greater than the pressure inside the reactor can be supplied to nozzle 902. The fuel can flow down the annular space between inner conduit 906 and outer conduit 905, with both fuel and oxygen passing through thermal shield 202 shown in FIG. 2. The fuel is preferably the byproduct methane. The hydrogen can be separated from the byproduct carbon dioxide, methane and carbon monoxide in process design steps that are known to individuals experienced in the art of gas purification. In a preferred embodiment herein, the fuel can be heated to a temperature that is near the temperature of the reactor pressure vessel 201. Heating of oxygen and fuel can reduce thermal stresses on connection nozzle 903 and nozzle adapter 904. A drywell type nozzle assembly is not required if the difference in temperature between OXB, BTF of FIG. 1, and the pressure vessel shell temperature 201 of FIG. 2 are below a design threshold. The design threshold can be established by a designer skilled in the art of both pressure vessel design and the computation of thermal stresses.

FIG. 10 depicts the lower section of the high temperature recuperative heat exchanger 4 described initially in FIG. 6. Product from the reactor can enter the lower space above the lower thermal shield bottom closure 617. The cylindrical section of thermal shield 602 can function as the shell of what is classified as a single pass shell and conduit heat exchanger. The term "shell and conduit heat exchanger" is known to individuals experienced in the art of heat transfer process design. The shell and heat exchanger can be configured in a counter current flow arrangement. Product from the reactor 2 can flow through the conduit side of the heat exchanger and transfer heat to the feedwater that is flowing through the shell side of the heat exchanger. The product can flow enter heat exchanger conduits 1004. The product flow proportions into each conduit can be in nearly equal portions. All conduits can be fixed to conduit sheet 1006. The number of conduits in the heat exchanger can be determined by engineering methods already established in the optimization of the heat exchanger design.

Baffles 1005A and 1005B direct the feedwater in a serpentine pattern and can be designed as part of the heat exchanger optimization process. After the feedwater is heated it can exit in conduit 606 and pass through the dry-well section inside nozzle 603. Dry-well seal 604 can use outer rings seals 1002 and inner rings 1003 to keep the gas in the dry-well from mixing with the water inside the reactor vessel.

FIG. 11 illustrates the upper half of the high temperature recuperative heat exchanger 4. Product can exit heat exchanger conduits 1004 and flow through an opening in the thermal shield cover 619 and into product discharge conduit 1105. Product discharge conduit 1105 can pass through pressure vessel cover 616 and terminate in adapter 1106. The product can finally exit nozzle 1107 for additional cooling and separation of hydrogen and the other byproduct gasses from the water. Extension conduit 1117 and tee 1118 inside diameters can be greater than the outside diameter of product discharge conduit that establishes a passage for the cooling water to exit the high temperature recuperative heat exchanger 4. Nozzle 1119 can be connected to heat exchanger 050 illustrated in FIG. 1. Feedwater stream FWS2 in FIG. 1 can feed conduit 612 that extends through the dry-well, and then through seal 614. Said dry-well seal can use outer ring seals 1103 and inner ring seals 1104 to keep the gas in the dry-well from mixing with the water in the reactor. High temperature recuperative heat exchanger 4 pressure vessel 601 and thermal shield 602 described previously are for reference only.

FIG. 12 depicts a lower Dry-well seal 503. This seal can be located under the process coupling and can be part of the process coupling previously described as part of FIG. 5. Conduit 410 can contain supercritical product that exited the reactor. The annular space under lower dry-well seal 503 can contain supercritical water that is part of the reactor cooling circuit. The annular volume above the seal can be pressurized with an inert gas. Inner seal rings 1201 and outer seal rings 1202 inhibit leakage of inert gas from the dry-well into the supercritical cooling water circuit. The pressure of the dry-well inert gas can be maintained at a pressure slightly greater than the supercritical water pressure. Connection number 504 can be in fluid communication with the dry-well drainage system to eliminate water or product that may have infiltrated during any pressure transients in the apparatus.

FIG. 13 depicts an upper dry-well seal in the process coupling assembly. This seal can be located above the process coupling. Recuperative heat exchanger 4 supply conduit 620 can be in fluid communication with the high temperature product gas produced in the reactor. Dry-well seal 511 can maintain a seal between the gas under the seal and the supercritical water above the seal and flowing in from stream 053 of FIG. 1 into the high temperature recuperative heat exchanger 4 for the purpose of cooling the thermal shield. Seal rings 1301 can seal the outside diameter of the dry-well seal and rings 1302 seal product flow conduit, allowing for differences in thermal expansion.

FIG. 14 is a vertical cross section and horizontal cross section of the cooling water distribution disks previously specified as 336 in FIGS. 3 and 618 in FIG. 6. A purpose of the distribution disks can be to both support the reactor thermal shield and to allow water from the cooling loop to flow radially outward and to maintain equal flow volumes in the interstitial space between the reactor, and the recuperative heat exchanger 4, thermal shield and pressure vessel shells. FIG. 14 section A-A is horizontal cross section of the cooling water distribution disk.

Example

The purpose of the following indicative example is to illustrate the savings potential of the novel apparatus disclosed herein. In this example and using the current codes and standards for the construction of pressure vessels, the cost of two options will be estimated and compared. To make the options comparable both reactor shells can be designed to have a 12 inch inside diameter and will be 20 feet in length. This results in equal reactor volumes and space velocities for the supercritical water reaction to approach equilibrium. Both options will assume a design pressure of 5000 psi. Both options will be designed for a reactor internal temperature of 1450° F. Given the continuous cooling of the thermal shield combined with the ability of the thermal shield to withstand a thermal gradient between the inside and outside surfaces, the present novel apparatus can allow for a reactor shell temperature design of 750° F. When quoting costs in this example all results are rounded to the nearest $1000. It must be noted that both commodity grade and specialty grade steel markets are volatile and this example is just a snapshot valid at the time this document was prepared. However, the ratio of costs between option 1 and option 2 is less volatile as the underling market forces driving price fluctuations are heavily linked. The specific pressure vessel code used herein is the 2018 American Society of Mechanical Engineers (ASME) section VIII, Division 1.

Option 1, Carbon Steel Construction with 1 Inch Thick Thermal Shield

The inside diameter of the reactor will be 14.5" inside diameter. The thermal shield will be 12" inside diameter and 14" in outside diameter, or 1" thick. An additional ¼" clearance is allowed for the flow path of the cooling circuit. The formula [codified as #1] for the minimum required wall thickness is:

$$t = \frac{P \times Ri}{SE - 0.6 \times P}$$

where:
t=thickness in inches
P=Internal design pressure in prig (5000)
Ri=Inside radius (7.25 inches)
SE=Code allowable stress, or 14,800 psi for Grade C plate steel at a design temperature of 750° F.

The resulting thickness is t=3.07 inches.
The pressure vessel outside diameter of the pressure vessel is 20.64 inches. The weight of the pressure vessel would be 11,518 pounds.

Option 2, Inconel 617 with No Thermal Shield

This material has a code allowable stress of 5100 psi at a temperature of 1450° F. Given that the initial trial thickness of 3.7 inches given by code equation #1 is greater than what is allowed by the code, a different formula is mandatory. The limiting formulas are:

$$t > \frac{1}{2} Ri$$

Or if $$P > 0.385 \times SE$$

The mandatory formula is given in ASME Section VIII, Division 1, Appendix 1 paragraph 1-2:

$$t = Ri\left(\text{Exp}\left(\frac{P}{SE}\right) - 1\right)$$

where:
t=thickness in inches
Ri=Inside Radius (6.00 inches)
P=Internal design pressure in prig (5000)
SE=Code allowable stress, or 5,100 psi for Inconel 617 plate steel at a design temperature of 1450° F.
The resulting thickness is t=9.99 inches
The pressure vessel outside diameter is 32 inches. The weight of the pressure vessel would be 50,044 pounds.
Economic Analysis of Option 1 vs. Option 2

The current market price for pressure vessel quality carbon steel is about $0.25/pound. Assuming the thermal shield material is Vycor™ (Corning trade name for consolidated high silica glass) is $15/pound, the pressure vessel and shield raw material costs are approximately $15,000. The current market price for pressure vessel grade super alloys, such as Inconel 617 is about $20/lb resulting in a raw material cost of approximately $1,000,000. Additional fabrication costs would be expected for the Inconel pressure vessel due to additional thickness and weight involved, but is not estimated herein as the economic advantage is already compelling.

Other advantages of the present apparatus are that the option 1 reactor is not limited to an operating temperature of 1450° F., and it can be operated at a significantly higher temperature resulting in better product yields. It also should be noted that all super alloys are given "time dependent" considerations in the published tables of code allowable stresses at operating temperatures greater than 1200° F. The pressure vessel designer is warned by the authors of the pressure vessel codes that the dimensional parameters of pressure vessels operating above threshold temperatures will be subject to changes over time and it would be expected that gasket tolerances would eventually fall out of specification and leakage is likely.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A supercritical fluid gasification system comprising:
a reactor including:
(i) a reactor shell having sidewalls that extend between a top reactor cover and a bottom reactor cover, the sidewalls of the reactor shell, the top cover, and the bottom cover enclosing a reactor shell channel;
(ii) a thermal shield positioned within the reactor shell channel, the thermal shield having sidewalls that extend between a top thermal shield cover and a bottom thermal shield cover, the sidewalls of the thermal shield, the top thermal shield cover, and the bottom thermal shield cover enclosing a thermal shield channel;
(iii) a fluid feed supply conduit in fluid communication with the thermal shield channel;
(iv) a supercritical fluid conduit in fluid communication with the thermal shield channel;
(v) a product conduit in fluid communication with the thermal shield channel;
(vi) a reactor cooling circuit including a first cooling conduit in fluid communication with the reactor shell channel, the first cooling conduit including a supercritical cooling stream, and
(vii) a recuperative heat exchanger including:
(a) a shell defining at least one internal channel, the at least one internal channel extending between a shell inlet and a shell outlet;
(b) heat exchanger conduits extending through the at least one internal channel of the shell, the heat exchanger conduits extending between an inlet and an outlet,
wherein the inlets of the heat exchanger conduits are in fluid communication with the product conduit of the thermal shield channel,
(c) a pressure vessel shell having sidewalls that extend between a top pressure seal cover and a bottom pressure seal cover, the sidewalls, the top pressure seal cover, and the bottom pressure seal cover enclosing a pressure vessel channel;
(d) a heat exchanger thermal shield positioned within the pressure vessel shell, the heat exchanger thermal shield having sidewalls that extend between a top heat exchanger thermal shield cover and a bottom heat exchanger thermal shield cover, the sidewalls, the top heat exchanger thermal shield cover, and the bottom heat exchanger thermal shield cover enclosing a heat exchanger thermal shield channel, and
wherein the heat exchanger conduits are positioned within the thermal shield.

2. The supercritical fluid gasification system of claim 1, wherein the supercritical fluid conduit is in fluid communication with the shell outlet.

3. The supercritical fluid gasification system of claim 1 further comprising:
a supercritical fluid nozzle sealingly coupled to the reactor shell, the supercritical fluid nozzle including a channel extending through the supercritical fluid nozzle, and wherein the supercritical fluid conduit extends through the channel within the supercritical fluid nozzle.

4. The supercritical fluid gasification system of claim 3, wherein the supercritical fluid nozzle includes a gas inlet and a gas outlet in fluid communication with the channel.

5. The supercritical fluid gasification system of claim 2, wherein the channel has an interior surface that is spaced from an exterior surface of the supercritical fluid conduit.

6. The supercritical fluid gasification system of claim 1 further comprising:
   a fluid feed nozzle sealingly coupled to the reactor shell, the fluid feed nozzle including a channel extending through the nozzle, and
   wherein the fluid feed supply conduit extends through the channel within the fluid feed nozzle.

7. The supercritical fluid gasification system of claim 1 further comprising:
   a cyclonic separator configured in the thermal shield channel, the cyclonic separator including:
      (i) a housing including a tangential inlet;
      (ii) cyclone walls extending from a top end in fluid communication with the product conduit to a bottom end in fluid communication with a drain conduit, and
   wherein at least a portion of the cyclone walls taper inward towards the bottom end.

8. The supercritical fluid gasification system of claim 1 further comprising:
   a coupling conduit including:
      (i) an outer coupling shell including a coupling conduit channel, and wherein the product conduit extends through the coupling conduit channel.

9. The supercritical fluid gasification system of claim 1, wherein the thermal shield comprises one or more metal oxides.

10. A supercritical fluid gasification system comprising:
    a reactor including:
       (i) a reactor shell having sidewalls that extend between a top reactor cover and a bottom reactor cover, the sidewalls of the reactor shell, the top cover, and the bottom cover enclosing a reactor shell channel;
       (ii) a thermal shield positioned within the reactor shell channel, the thermal shield having sidewalls that extend between a top thermal shield cover and a bottom thermal shield cover, the sidewalls of the thermal shield, the top thermal shield cover, and the bottom thermal shield cover enclosing a thermal shield channel;
       (iii) a fluid feed supply conduit in fluid communication with the thermal shield channel;
       (iv) a supercritical fluid conduit in fluid communication with the thermal shield channel;
       (v) a product conduit in fluid communication with the thermal shield channel; and
       (vi) a reactor cooling circuit including a first cooling conduit in fluid communication with the reactor shell channel, the first cooling conduit including a supercritical cooling stream,
    wherein the thermal shield comprises:
       from 90 wt % to 98 wt % of silica, based on the total weight of the thermal shield; and
       from 2 wt % to 10 wt % boron trioxide, based on the total weight of the thermal shield.

11. The supercritical fluid gasification system of claim 1, wherein the thermal shield comprises:
    from 99 wt % to 100 wt % of silica.

12. A supercritical fluid gasification system comprising:
    a reactor including:
       (i) a reactor shell having sidewalls that extend between a top reactor cover and a bottom reactor cover, the sidewalls, the top cover, and the bottom cover enclosing a reactor shell channel;
       (ii) a thermal shield positioned within the reactor shell channel, the thermal shield having sidewalls that extend between a top thermal shield cover and a bottom thermal shield cover, the sidewalls, the top thermal shield cover, and the bottom thermal shield cover enclosing a thermal shield channel;
       (iii) a fluid feed supply conduit in fluid communication with the thermal shield channel;
       (iv) a supercritical fluid conduit in fluid communication with the thermal shield channel;
       (v) a product conduit in fluid communication with the thermal shield channel; and
       (vi) a reactor cooling circuit including:
          a supplemental feedwater conduit in fluid communication with a T-junction that splits the supplemental feedwater conduit into a first cooling conduit and a second cooling conduit,
          wherein the first cooling conduit is in fluid communication with the reactor shell channel, and
          wherein the second cooling conduit is in fluid communication with the thermal shield channel.

13. The supercritical fluid gasification system of claim 12, wherein the first cooling conduit is placed in fluid communication with the reactor shell channel at an outlet positioned on an upper portion of the reactor shell.

14. The supercritical fluid gasification system of claim 12, wherein the second cooling conduit is in fluid communication with the thermal channel at an outlet position on a bottom portion of the reactor shell and the thermal shield.

15. The supercritical fluid gasification system of claim 1 further comprising:
    an oxygen conduit in fluid communication with the thermal shield channel.

16. A method comprising the steps of:
    (a) feeding a carbonaceous feed material to a reactor through a fluid feed supply conduit; and
    (b) feeding a supercritical feedwater to the reactor through a supercritical feed supply conduit, the reactor including:
       (i) a reactor shell having sidewalls that extend between a top reactor cover and a bottom reactor cover, the sidewalls of the reactor shell, the top cover, and the bottom cover enclosing a reactor shell channel;
       (ii) a thermal shield positioned within the reactor shell channel, the thermal shield having sidewalls that extend between a top thermal shield cover and a bottom thermal shield cover, the sidewalls of the thermal shield, the top thermal shield cover, and the bottom thermal shield cover enclosing a thermal shield channel;
       (iii) the fluid feed supply conduit in fluid communication with the thermal shield channel;
       (iv) the supercritical fluid conduit in fluid communication with the thermal shield channel; and
       (v) a product conduit in fluid communication with the thermal shield channel, the product conduit dispensing a product stream from the reactor, and
    (c) cooling the reactor with a supercritical cooling stream.

17. The method of claim 16 further comprising:
    cooling the product stream in a recuperative heat exchanger, the recuperative heat exchanger including:
       (i) a shell defining at least one internal channel, the at least one internal channel extending between a shell inlet and a shell outlet;

(ii) heat exchanger conduits extending through the at least one internal channel of the shell, the heat exchanger conduits extending between an inlet and an outlet, wherein the inlets of the heat exchanger conduits are in fluid communication with the product conduit of the thermal shield channel.

18. The method of claim 17 further comprising:

heating a supercritical feedwater stream in the recuperative heat exchanger by passing the supercritical feedwater stream through the at least one internal channel of the shell.

19. The method of claim 18 further comprising:

feeding the supercritical feedwater stream exiting the at least one internal channel of the shell to the supercritical fluid conduit.

20. The supercritical fluid gasification system of claim 1, wherein flow of the supercritical cooling stream can be induced without the need of a pump.

* * * * *

UNITED STATES PATENT AND TRADEMARK OFFICE
CERTIFICATE OF CORRECTION

PATENT NO. : 12,318,765 B2
APPLICATION NO. : 17/617523
DATED : June 3, 2025
INVENTOR(S) : Thomas J. Baudhuin Page 1 of 1

It is certified that error appears in the above-identified patent and that said Letters Patent is hereby corrected as shown below:

In the Specification

Column 21, Line 16, "FIGS." should be --FIG.--.

Column 23, Line 62, "FIGS." should be --FIG.--.

Column 24, Line 48, "prig" should be --psig--.

Column 25, Line 15, "prig" should be --psig--.

Signed and Sealed this
Twelfth Day of August, 2025

Coke Morgan Stewart
*Acting Director of the United States Patent and Trademark Office*